(12) United States Patent
Bagheri et al.

(10) Patent No.: US 10,111,191 B2
(45) Date of Patent: Oct. 23, 2018

(54) SYSTEMS AND METHODS FOR A USER EQUIPMENT TO BECOME A SYNCHRONIZATION SOURCE

(71) Applicant: Futurewei Technologies, Inc., Plano, TX (US)

(72) Inventors: Hossein Bagheri, Urbana, IL (US); Philippe Sartori, Plainfield, IL (US); Anthony C.K. Soong, Plano, TX (US); Deping Liu, Beijing (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 281 days.

(21) Appl. No.: 14/820,185

(22) Filed: Aug. 6, 2015

(65) Prior Publication Data

US 2016/0044620 A1 Feb. 11, 2016

Related U.S. Application Data

(60) Provisional application No. 62/034,280, filed on Aug. 7, 2014.

(51) Int. Cl.
*H04W 56/00* (2009.01)
*H04W 76/14* (2018.01)
(Continued)

(52) U.S. Cl.
CPC ....... *H04W 56/0015* (2013.01); *H04W 24/10* (2013.01); *H04W 72/0406* (2013.01); *H04W 76/023* (2013.01); *H04W 76/14* (2018.02)

(58) Field of Classification Search
CPC ............... H04W 24/10; H04W 76/023; H04W 72/0406; H04W 56/0015
See application file for complete search history.

(56) References Cited

U.S. PATENT DOCUMENTS 9,763,272 B2 9/2017 Liu et al.
9,769,857 B2 9/2017 Sartori et al.
(Continued)

FOREIGN PATENT DOCUMENTS

CN 102256334 A 11/2011
CN 103250435 A 8/2013
(Continued)

OTHER PUBLICATIONS

Huawei et al., "D2D Synchronization Procedure in Partial Network Coverage", Mar. 31-Apr. 4, 2014, 3GPP TSG RAN WG1 Meeting #76b, R1-141142.*
Huawei et al., "D2D Synchronization Procedure for in-coverage", May 19-23, 2014, 3GPP TSG RAN WG1 Meeting #77, R1-141926.*
Samsung, "D2D synchronization procedure for partial network coverage", May 19-23, 2014, 3GPP TSG Ran WG1 Meeting #77, R1-142121.*
(Continued)

*Primary Examiner* — Peter Chau
(74) *Attorney, Agent, or Firm* — Slater Matsil, LLP

(57) ABSTRACT

Systems and methods for User Equipment (UE) synchronization for Device-to-Device (D2D) out-of-coverage communication are provided. In an embodiment, a method in an in-coverage (IC) UE for the IC UE to become a synchronization source for out-of-coverage UEs for D2D communication includes obtaining, by the IC UE scanning parameters; scanning, by the IC UE, for out-of-coverage synchronization signals; transmitting, by the IC UE, a measurement report to a Transmission Point (TP) in response to a report trigger, the measurement report comprising information of one or more received out-of-coverage synchronization signals; receiving, by the IC UE, a configuration command from the TP instructing the IC UE to become a synchronization source in response to a configuration command from the TP; and transmitting, by the IC UE, a D2D synchronization signal (SS) for a duration of time or until instructed not to do so by the TP.

36 Claims, 17 Drawing Sheets

(51) Int. Cl.
*H04W 24/10* (2009.01)
*H04W 72/04* (2009.01)
*H04W 76/02* (2009.01)

(56) References Cited

U.S. PATENT DOCUMENTS

| | | | | |
|---|---|---|---|---|
| 2011/0292895 | A1* | 12/2011 | Wager | H04L 5/0007 370/329 |
| 2013/0083779 | A1 | 4/2013 | Ahn et al. | |
| 2014/0079043 | A1* | 3/2014 | Montemurro | H04W 52/0216 370/338 |
| 2014/0153444 | A1 | 6/2014 | Zhou et al. | |
| 2015/0117375 | A1* | 4/2015 | Sartori | H04W 56/001 370/329 |
| 2015/0215763 | A1* | 7/2015 | Ro | H04W 8/005 455/426.1 |
| 2015/0327201 | A1* | 11/2015 | He | H04W 48/16 370/336 |
| 2015/0327204 | A1* | 11/2015 | Park | H04W 56/0015 370/350 |
| 2017/0188321 | A1* | 6/2017 | Matsumoto | H04W 56/002 |

FOREIGN PATENT DOCUMENTS

| | | | |
|---|---|---|---|
| EP | 2124167 | A1 | 11/2009 |
| EP | 2925067 | A1 | 9/2015 |
| JP | 2009232027 | A | 10/2009 |
| WO | 2015066524 | A1 | 5/2015 |

OTHER PUBLICATIONS

Kyocera, "Synchronization procedure", May 19-23, 2014, 3GPP TSG RAN WG1 Meeting #77, R1-142489.*
International Search Report and Written Opinion of the International Searching Authority received in Patent Cooperation Treaty Application No. PCT/CN2015/086388 dated Nov. 10, 2015, 11 pages.
"Synchronization Between in and out of Coverage UEs," Agenda item: 7.2.8.1.1, Source: HTC, 3GPP TSG RAN WG1 Meeting #76, R1-140225, Feb. 10-14, 2014, 3 pages.
Huawei, et al., "D2D Synchronization Procedure in Partial Network Coverage," 3GPP TSG RAN WG1 Meeting #76b, R1-141142, Shenzhen, China, Mar. 31-Apr. 4, 2014, 4 pages.
Huawei, et al., "D2D Synchronization Procedure for in-coverage," 3GPP TSG RAN WG1 Meeting #77, R1-141926, Seoul, Korea, May 19-23, 2014, 4 pages.
Kyocera, "Synchronization procedure," 3GPP TSG RAN WG1 Meeting #77, R1-142489, Seoul, Korea, May 19-23, 2014, 4 pages.
Samsung, "D2D synchronization procedure for partial network coverage," 3GPP TSG RAN WG1 Meeting #77, R1-142121, Seoul, Korea, May 19-23, 2014, 8 pages.
Alcatel-Lucent, "Chairman's Notes of Agenda Item 6.2.5 LTE Device to Device Proximity Services," 3GPP TSG RAN WG1 Meeting #77, R1-142721, Seoul, South Korea, May 19-23, 2014, 16 pages.
QUALCOMM Inc., "Work item proposal on LTE Device to Device Proximity Services," 3GPP TSG RAN Meeting #63, RP-140518, Fukuoka, Japan, Mar. 3-6, 2014, 7 pages.

* cited by examiner

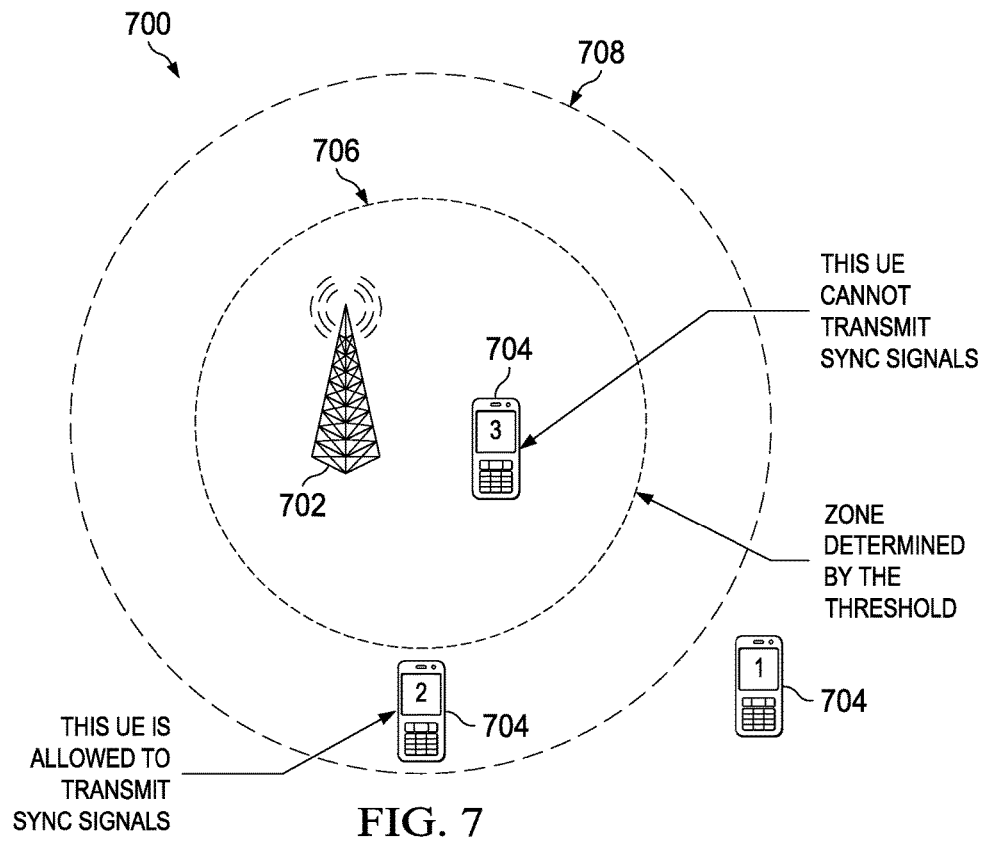
FIG. 7
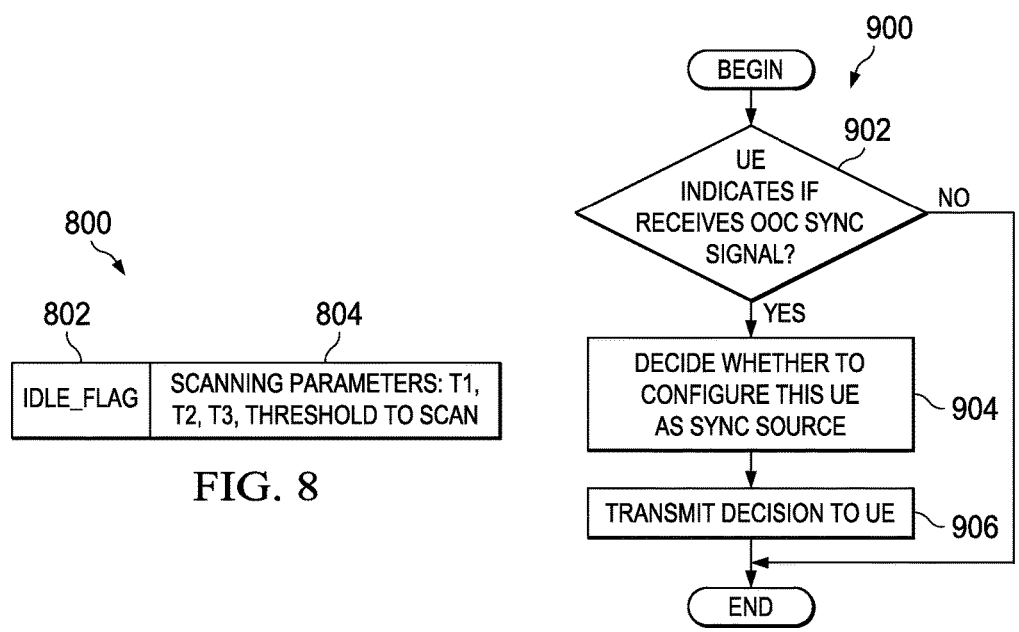
FIG. 8
FIG. 9

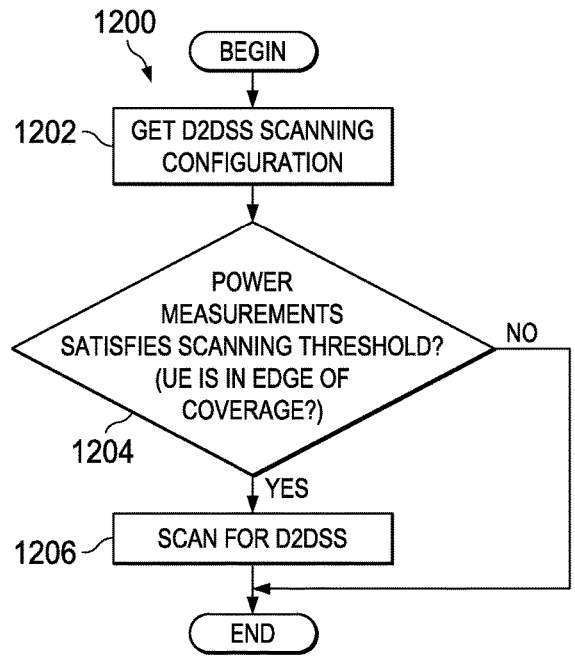
FIG. 12
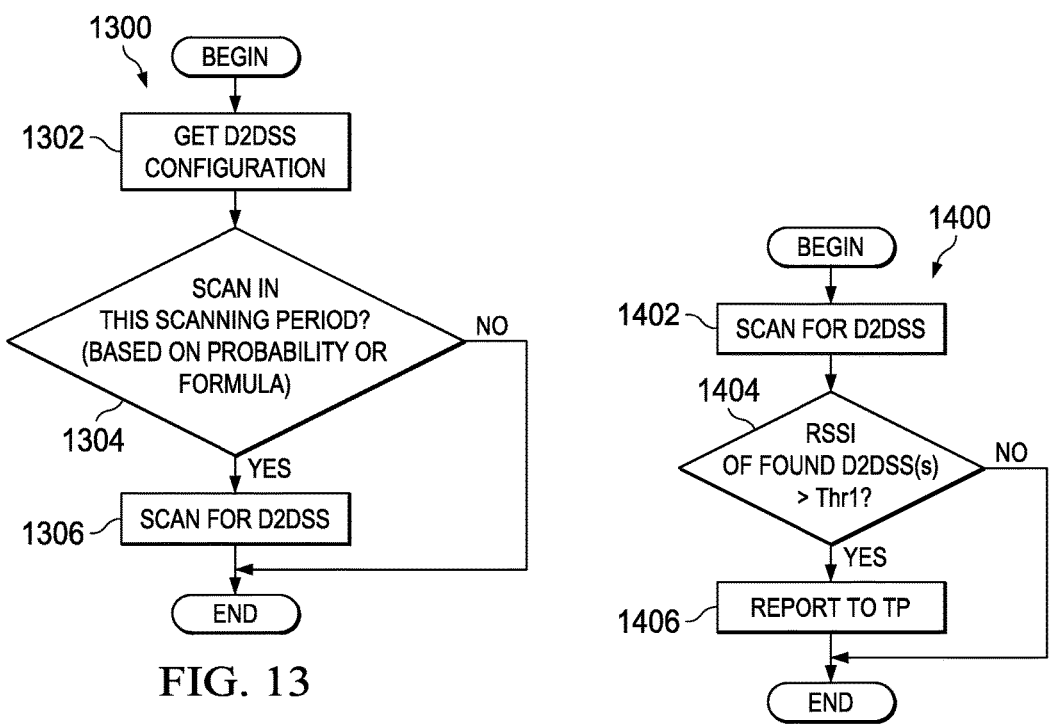
FIG. 13
FIG. 14

SYSTEMS AND METHODS FOR A USER EQUIPMENT TO BECOME A SYNCHRONIZATION SOURCE

This application claims the benefit of U.S. Provisional Application No. 62/034,280, filed on Aug. 7, 2014, entitled "System and Method for User Equipment Synchronization," which application is hereby incorporated by reference.

TECHNICAL FIELD

Background

The present invention relates to a system and method for wireless communications, and, in particular embodiments, to a system and method for user equipment synchronization.

Device-to-device (D2D) communication is being standardized in 3GPP rel-12. As per 3GPP RAN RP140518, the objective is to enable device-to-device discovery in network coverage (intra-cell and inter-cell) and D2D communication in network coverage (intra-cell and inter-cell), in partial network coverage and outside network coverage. The communication part is targeted to apply only to public safety use. The partial network coverage and out of network coverage scenarios apply only to public safety use.

SUMMARY

An embodiment method in an in-coverage (IC) user equipment (UE) for the IC UE to become a synchronization source for out-of-coverage UEs for device-to-device (D2D) communication includes obtaining, by the IC UE, scanning parameters; scanning, by the IC UE, for out-of-coverage synchronization signals; transmitting, by the IC UE, a measurement report to a Transmission Point (TP) in response to a report trigger, the measurement report comprising information of one or more received out-of-coverage synchronization signals; receiving, by the IC UE, a configuration command from the TP instructing the IC UE to become a synchronization source; and transmitting, by the IC UE, a D2D synchronization signal (SS) for a duration of time or until instructed not to do so by the TP.

An embodiment in-coverage (IC) user equipment (UE) includes a processor and a non-transitory computer readable storage medium storing programming for execution by the processor, the programming including instructions to: obtain scanning parameters; scan for out-of-coverage synchronization signals; transmit a measurement report to a Transmission Point (TP) in response to a report trigger, the measurement report comprising information of one or more received out-of-coverage synchronization signals; receive a configuration command from the TP instructing the IC UE to become a synchronization source; and transmit a device-to-device (D2D) synchronization signal (SS) for a duration of time or until instructed not to do so by the TP.

An embodiment method in a transmission point (TP) for selecting an in-network-coverage user equipment (UE) to serve as a synchronization source for out-of-network-coverage UEs for device-to-device (D2D) communications includes receiving, with the TP, a measurement report from a first one of a plurality of in-network-coverage UEs, the measurement report corresponding to an out-of-network coverage UE; selecting, with the TP, a second one of the in-network-coverage UEs to be a synchronization source; and transmitting, with the TP, a configuration message to the second one of the in-network-coverage UEs, the configuration message identifying the second one of the in-network-coverage UEs as the synchronization source, wherein only the second one of the in-network-coverage UEs is permitted to transmit a D2D synchronization signal (SS) during a specified time frame.

An embodiment transmission point (TP) includes a processor and a non-transitory computer readable storage medium storing programming for execution by the processor, the programming including instructions to: receive a measurement report from a first one of a plurality of in-network-coverage UEs, the measurement report corresponding to an out-of-network coverage UE; select a second one of the in-network-coverage UEs to be a synchronization source; and transmit a configuration message to the second one of the in-network-coverage UEs, the configuration message identifying the second one of the in-network-coverage UEs as the synchronization source, wherein only the second one of the in-network-coverage UEs is permitted to transmit a D2D synchronization signal (SS) during a specified time frame.

BRIEF DESCRIPTION OF THE DRAWINGS

For a more complete understanding of the present invention, and the advantages thereof, reference is now made to the following descriptions taken in conjunction with the accompanying drawing, in which:

FIG. 7 illustrates an embodiment system for synchronizing devices for D2D communication using a zone power threshold;

FIG. 8 illustrates another embodiment of an SIB message for scanning;

FIG. 9 illustrates an embodiment procedure for turning on/off of UEs as synchronization sources;

FIG. 12 illustrates an embodiment UE procedure for scanning;

FIG. 13 illustrates an alternative embodiment UE procedure for scanning;

FIG. 14 illustrates an embodiment UE procedure for reporting found D2DSS(s);

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

There are two main device-to-device (D2D) approaches: discovery and communications. In discovery, a user equipment (UE) attempts to discover neighboring UEs, either on its own or directed by the communications controller, such as enhanced Node B (eNB). In communications, one UE directly communicates with another UE without the data transiting through the transmission point (TP). A D2D link is a direct communication between two UEs.

Figure 1:
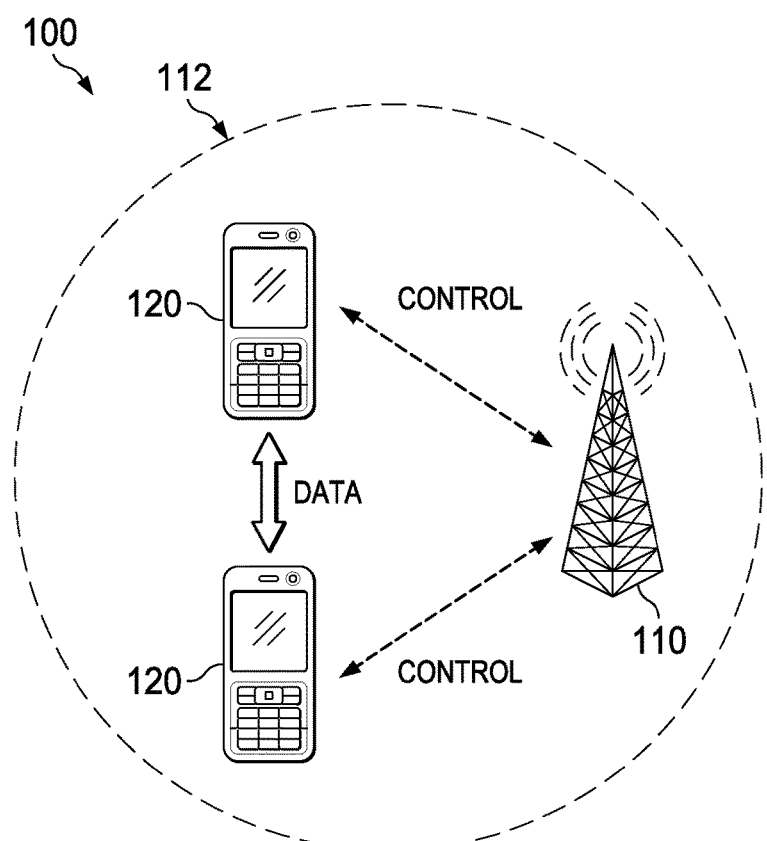
FIG. 1 illustrates an embodiment of communication network with D2D communication (network-centric scenario)

FIG. 1 illustrates a network 100 for communicating data. The network 100 comprises a TP 110 having a coverage area 112, and a plurality of user equipment (UEs) 120. As used herein, the term TP may also be referred to as an access point (AP), a base station (BS), a Node B (NB), and enhanced Node B (eNB), a femtocell, or a base transceiver station (BTS), or other wirelessly enabled devices, and the terms may be used interchangeably throughout this disclosure. The coverage area 112 represents the range of the TP 110 to adequately transmit data. The TP 110 may comprise any component capable of providing wireless access by, inter alia, establishing uplink (UL) and/or downlink (DL) connections with the UEs 120. UL transmissions are transmissions from the UE 120 to the TP 110 and DL transmissions are transmissions from the TP 110 to the UE 120. The UEs 120 may comprise any component capable of establishing a wireless connection with the TP 110. For example, the UE 120 may be a smartphone, a laptop computer, a tablet computer, a wireless telephone, etc. The UEs 120 may also be referred to as wireless devices, mobile devices, or wireless mobile devices. In some embodiments, the network 100 may comprise various other wireless devices, such as relays, femtocells, etc. The TP 110 is configured to exchanges control information with the UEs 120 and the UEs are configured to exchange D2D data with each other.

There are two main ways of implementing D2D: device-centric and network-managed. With device-centric (aka "lifestyle"), devices initiate D2D connections and communication without network oversight. With network-managed, the network initiates a D2D connection between one or more UEs when conditions are appropriate. Conditions include local parameters, such as the proximity of devices, as well as macro parameters, such as overall traffic demand, location of non D2D devices, etc. The methods of implementing D2D (i.e., device-centric versus network-managed) should be distinguished from the discovery and communication functions. Device-centric versus network managed D2D indicates which entity initiates the discovery and communication D2D functions. This approach offers the potential for local offloading, which may be attractive to cellular operators. Local offloading is the use of complementary network technologies (e.g., D2D communication, WiFi, etc.) for delivering data originally targeted for cellular networks. Local offloading reduces the amount of data being carried on the cellular bands, freeing bandwidth for other users. Local offloading may also be used in situations where local cell reception may be poor, thereby allowing the user to connect via wired services with better connectivity.

For D2D communication, it is also generally assumed that D2D transmissions occur on the UL portion of the bandwidth since the interference would be less prejudicial to cellular UEs on the UL, where a transmitting D2D UE interferes with the reception of signals at the TP. Consequently, as long as the D2D UE is at a reasonable distance from the TP, the interference created by the D2D UE has little impact. Conversely, if D2D transmission occurs on the DL portion of the bandwidth, D2D interference affects neighboring UEs, and potentially, their ability to receive synchronization channels and control channels such as the physical DL control channel (PDCCH). Thus, D2D transmissions on the DL portion of the bandwidth result in significantly higher impact to system operation than D2D transmissions on the UL portion of the bandwidth.

Synchronization between the D2D UEs allows them to efficiently establish a link. A UE may become a synchronization source (SS) and transmit a D2D synchronization signal (D2DSS) based on a sequence. Recently, in 3GPP, it has been agreed that [5] the set of D2DSS that can be transmitted by a UE is divided into two groups: D2DSSue_net, which is a set of D2DSS sequence(s) transmitted by UE when the transmission timing reference is a TP, and D2DSSue_oon, which is a set of D2DSS sequence(s) transmitted by UE when the transmission timing reference is not an TP.

A problem that arises when UEs are out-of-network, or in-network but in unsynchronized cells, is that UEs generally need to obtain a common time, and potentially frequency, reference signal. Embodiments disclosed herein provide such synchronization.

Two problems are specifically addressed: first, to help out-of-coverage UEs synchronize to TPs, and second, to facilitate inter-cell communication/discovery in the case of an asynchronous network.

An embodiment minimizes the number of synchronization signals. Having multiple synchronization signals is a suboptimal solution because, from the UE perspective, there is a waste in transmit power, and from the network perspective, there is a waste in resource usage. Furthermore, the receiver operation can become complex due to automatic gain control (AGC) issues when the received power of another channel is significantly different than that of the synchronization signal.

Figure 2:
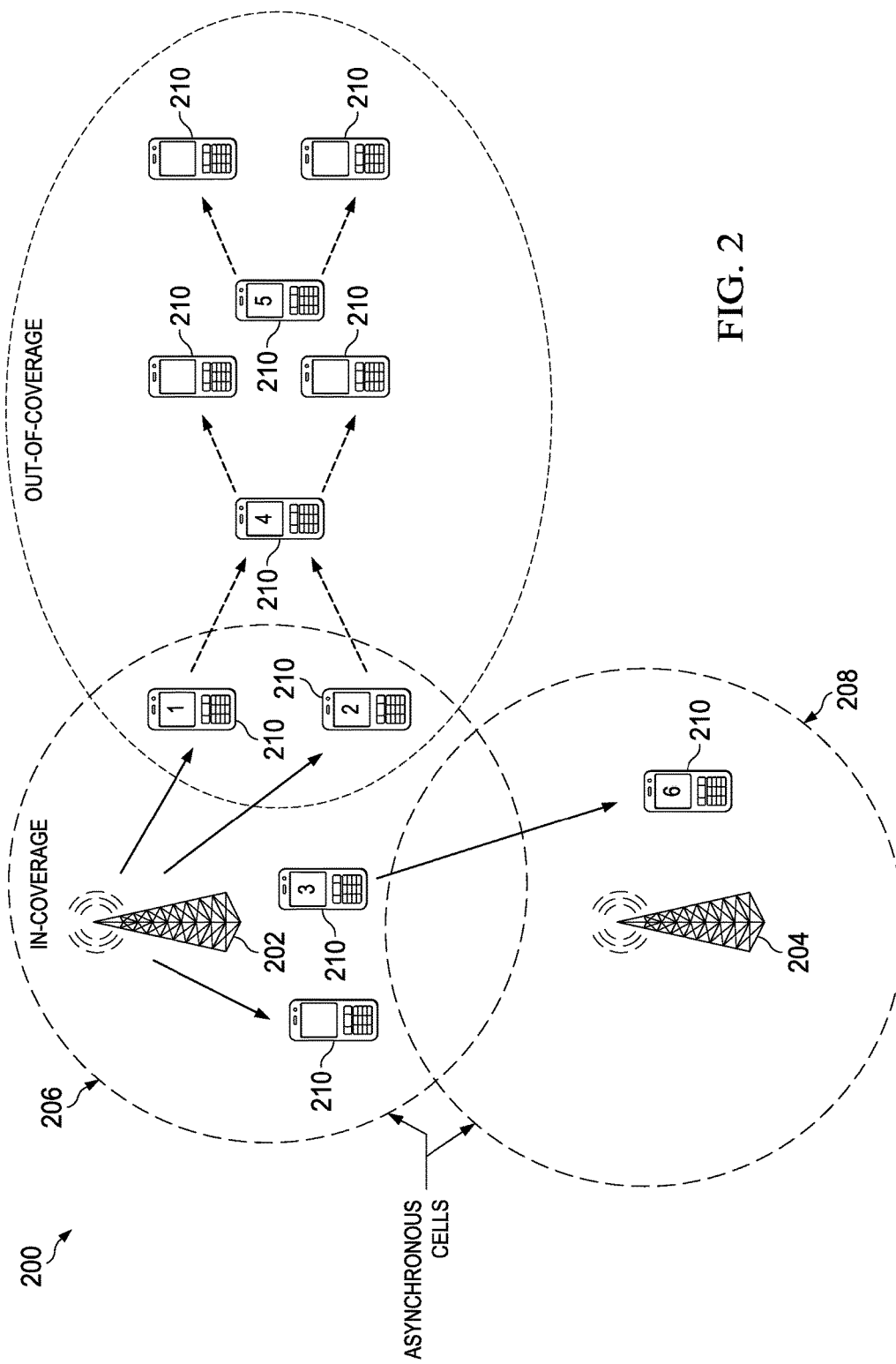
FIG. 2 illustrates an embodiment system for synchronizing devices for D2D communication.

FIG. 2 illustrates an embodiment system 200 for synchronizing devices for D2D communication. System 200 illustrates various scenarios for D2D synchronization. The system 200 includes a plurality of TPs 202, 204, each with a respective coverage area (or cell) 206, 208. The system 200 also includes a plurality of UEs 210. Some of the UEs are within coverage area 206, some of the UEs 210 are within coverage area 208, and some of the UEs are out of the coverage of both coverage area 206 or coverage area 208. The UEs 210 include UEs labeled as UE1, UE2, UE3, UE4, UE5, and UE6. Three cases for synchronization are shown in the figure. Synchronization for an out-of-coverage UE 210 that can listen to an in-coverage UE 210 is shown for UE4 in FIG. 2. Synchronization of an out-of-coverage UE 210 that cannot listen to an in-coverage UE 210 is shown for UE 5. Synchronization of an in-coverage UE 210 in one cell 206 with another in-coverage UE 210 in another cell 208, the two cells 206, 208 being unsynchronized, is shown for UE 6 and UE3. These three cases are discussed below.

A procedure for an out-of-coverage UE that can listen to an in-coverage UE has been previously described in the literature. See, e.g., R1-141926, "D2D Synchronization Procedure for In-coverage," Huawei, HiSilicon, RAN1#77, May 19-23, 2014, which is incorporated herein by reference in its entirety. When an out-of-coverage UE 210 does not receive a synchronization signal, it transmits a wake-up signal. If an in-coverage UE 210 receives the wake-up signal, it then starts to transmit its sync signal, after being authorized by the TP 202, 204. The out-of-coverage UE 210, when receiving this sync signal, stops transmitting its wake up signal. In practice, the wake up signal is likely to be an out-of-coverage synchronization signal, and some of the solutions described herein rely on this assumption.

Figure 3:
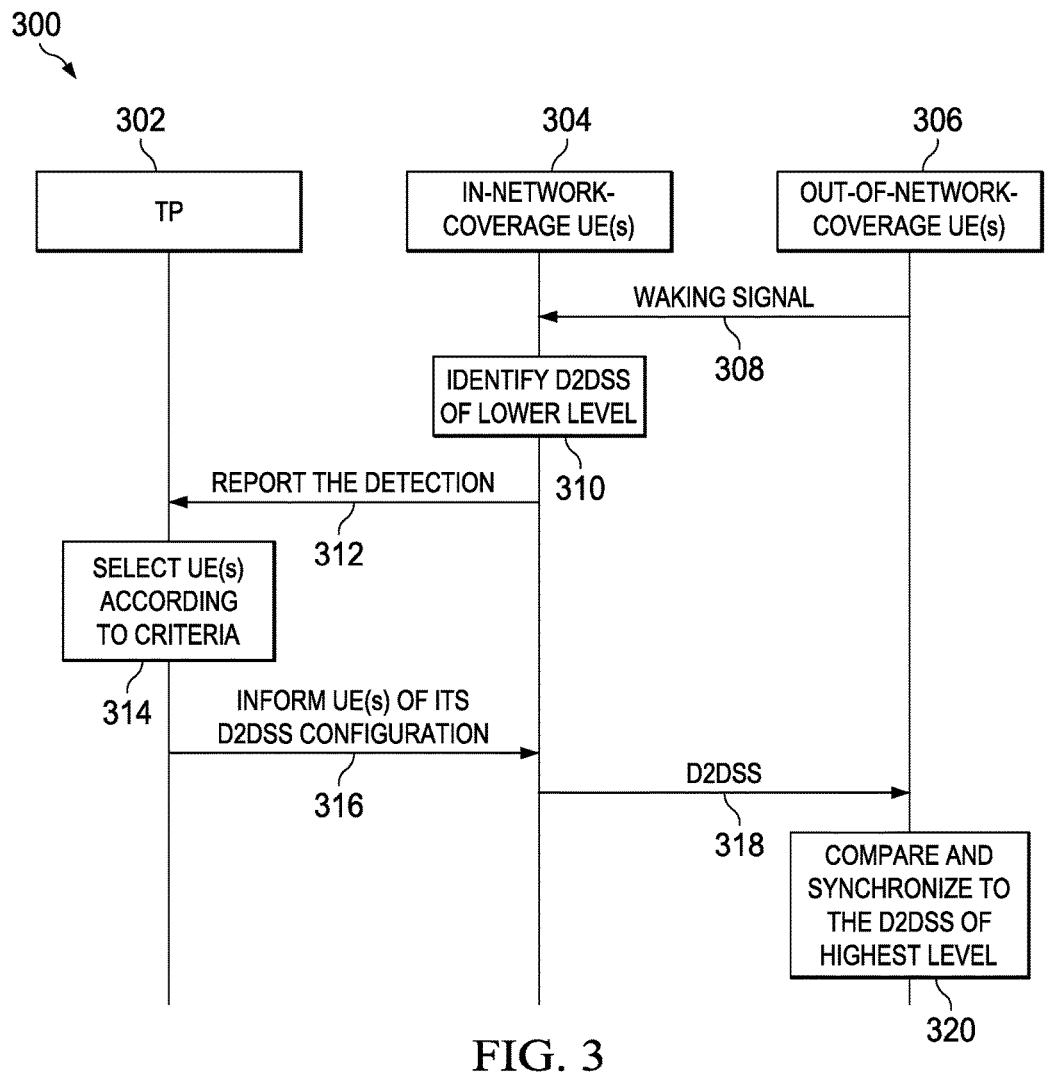
FIG. 3 illustrates an embodiment of a wake up signal procedure.

FIG. 3 illustrates an embodiment of a wake up signal procedure 300. An out-of-network-coverage UE(s) 306 sends a waking signal 308 to the in-network-coverage UE(s) 304. The in-network-coverage UE(s) 304 identify the D2DSS of the lower level 310 and report the detection 312 to the TP 302. The TP 302 selects one or more UE(s) 304 according to various criteria 314 and informs the UE(s) 304 of its D2DSS configuration 316. In various embodiments, the criteria 314 may include one or more of receive power, signal-to-noise ratio (SNR), signal-to-interference-plus-noise ratio (SINR), and UE capability. The in-network-coverage UEs 304 sends a D2DSS message 318 to the out-of-network-coverage UE(s) 306. The out-of-network UEs 306 compare and synchronize to the D2DSS of the highest level 320.

Returning now to FIG. 2, in the following description, additional details about the in-coverage UE procedure, the out-of-coverage UE procedure, and the TP 202 are given. Although described with reference to TP 202, those of ordinary skill in the art will recognize that TP 204 may perform similar procedures.

The general procedure is as follows. The TP 202 configures UEs 210 to periodically listen for out-of-coverage UEs (referred to as scanning herein). The UEs 210 configured for monitoring can be either radio resource control (RRC)-IDLE or RRC-Connected UEs. When a UE 210 detects the out-of-coverage UE 210, it starts transmitting the synchronization signal.

The TP 202 is responsible for two operations: determining which UE(s) 210 participate in the scanning process, and configuring a UE to become or stop being a synchronization source.

There are several manners for the TP 202 to inform the UEs 210 as to which ones will do the scanning. In a first alternative, the TP 202 explicitly sends a message to the UEs 210 instructing one or more of the UEs 210 to do the scanning. In a second alternative, the TP 202 communicates parameters to the UEs 210 in a system information block (SIB) where the parameters identify which one(s) of the UEs 210 are to perform the scanning. The TP may determine which UEs 210 are to scan and when or, in an alternate embodiment, the TP may determine conditions which the UEs 210 use to determine whether and when to scan. Regardless of the particular message type selected, in various embodiments, the TP 202 may send the instructions regarding scanning to all of the relevant UEs 210 or only the UEs 210 selected for scanning. In various embodiments, the TP 202 TP instructs all relevant UEs 210 to scan in a blanket command. In another embodiment, the TP 202 selects some of the available UEs 210 to scan and sends the selected UEs 210 a message that instructs them to scan. In another embodiment, the TP 202 selects some of the available UEs 210 to scan, sends the selected UEs parameters regarding how and when to scan, and then the selected UEs 210 scan according to the parameters. In an embodiment, the TP 202 sends parameters to all relevant UEs 210, but then the UEs 210 use the parameters to decide whether to scan or not to scan. The parameters may be included as part of another signal sent to the UEs 210, such as part of an SIB as mentioned above or may be included in a message dedicated solely to communicating scanning instructions to the UEs 210.

With alternative one, the TP 202 selects a group of UEs 210 within the cell 206, 208. The UEs 210 can either be idle or connected. The TP 202 can use the channel state information (CSI) report to select UEs 210 at strategic locations within the cell 206, 208, e.g., close to the cell-edge.

Figure 4:
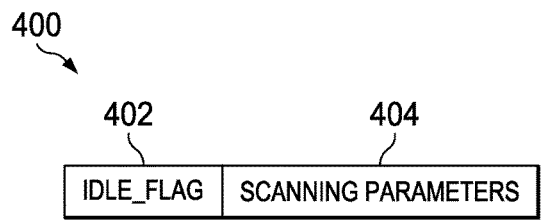
FIG. 4 illustrates an embodiment of System Information Block (SIB) parameters for a scanning operation.

With alternative two, the UEs 210 having the capability of becoming an in-coverage synchronization source listen to an SIB. FIG. 4 illustrates an embodiment of an SIB 400. The SIB 400 may contain an idle flag 402 and scanning parameters 404 as shown in FIG. 4. The IDLE_FLAG 402 is a flag to indicate if idle UEs 210 can participate in this process (optional parameter). The scanning parameters 404 indicate when UEs 210 need to listen, and for how long (e.g., a list of subframes).

Figure 5:
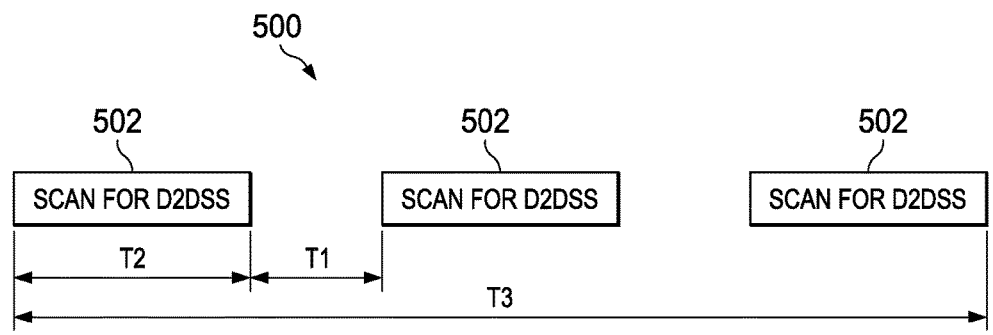
FIG. 5 illustrates an embodiment of scanning parameters.

FIG. 5 illustrates an embodiment configuration 500 of scanning parameters and their use. The configuration can be characterized by three parameters, T1, T2 and T3, which are somewhat analogous to the discontinuous transmission (DTX) parameters. In an embodiment, the parameters, T1, T2, and T3, may be transmitted to the UE(s) 210 in an SIB where the parameters may be included in the scanning parameters 404. In another embodiment, the parameters may be provided to the UE(s) 210 through a dedicated radio resource control (RRC) signaling message.

T1 is the gap between scanning windows 502. In order to save battery power, generally it is better to have a UE 210 not scanning all the time since scanning requires listening all the time. T1 indicates the time a UE 210 can operate without scanning once it is done with a scanning process.

T2 is the length of the scanning window 502. T2 indicates how long the UE 210 has to continuously listen and attempt to decode synchronization signals.

T3 is the total length of scanning including the gaps. It indicates the time the UE 210 has to perform the overall scanning process. In an embodiment, this parameter is optional, and other mechanisms are possible, such as the TP 202, 204 sending the commands to start/stop scanning.

In addition, the message 400 may include a threshold $Th_1$. A UE would be required to report synchronization signal information only if the received signal strength (RSS) of the synchronization signal is larger than $Th_1$. Alternatively, other quality parameters may be used as well (e.g., stratum number, etc.).

As an alternative to the TP 202, 204 managing the scanning configuration, the parameters T1, T2 and T3 can also be preconfigured. Additionally, the TP 202, 204 may signal a start time, either directly (e.g., subframe/radio frame index) or indirectly (e.g., based on a formula).

The TP 202, 204 may control the number of UEs 210 scanning at a given time. As will be described below, such scanning may trigger a UE 210 report. An advantage of limiting number of UEs 210 scanning at given time instances would be to trigger less UE 210 reports at a time and save network UL resources.

Figure 6:
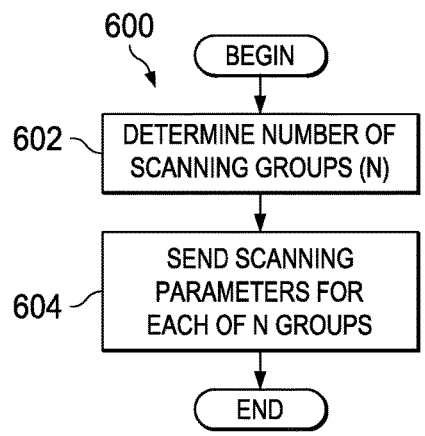
FIG. 6 illustrates an embodiment Transmission Point (TP) procedure for grouping of scanning UEs.

FIG. 6 illustrates an embodiment TP procedure 600 for grouping of scanning UEs. In the example shown in FIG. 6, the TP 202, 204 divides UEs 210 into N groups scanning at different times. At block 602, the TP 202, 204 determines the number, N, of scanning groups. At block 604, the TP 202, 204 sends the scanning parameters for each of the N scanning groups to the UEs 210 in the N scanning groups. UEs 210 in each group scan according to the scanning parameters for their group. Thus, N groups could be created (e.g., based on the UE ID), and a list of N scanning_parameters could be sent, along with the rule to determine the N groups, and the value of N. Alternatively, the decision to perform scanning can be probabilistic, e.g., depending on the UE ID. Similarly, the probability parameters can be sent to the UE 210 e.g., in a SIB or pre-configured.

FIG. 7 illustrates an embodiment system 700 for synchronizing devices for D2D communication using a zone power threshold. System 700 includes an TP 702 and a plurality of UEs 704. In an embodiment, it may be valuable to only have UEs 704 (i.e., UE2 in FIG. 7) close to the cell edge 708 doing the scanning because theses UEs 708 (such as UEs 1-3 in FIG. 2) are closer to potential UEs 704 (i.e., UE 1) in out-of-network or in other unsynchronized cells. It is unlikely that an out-of-coverage UE 704 could listen to an in-coverage UE 704 (e.g., UE3 in FIG. 7) close to the TP 702, and not the TP 702.

FIG. 8 illustrates another embodiment of an SIB 800 for scanning SIB 800 includes in IDLE_FLAG 802 and scanning parameters 804 similar to SIB 400. However, in order to avoid unnecessary transmissions, the SIB 800 includes a power threshold in the scanning parameters 804 in addition to parameters T1, T2, and T3. Note that this threshold is different than $Th_1$ mentioned earlier. The zone 706 within which UEs 704 (e.g., UE3) are not allowed to transmit sync signals is determined according to the power threshold.

The UEs 704 (e.g., UE3) receiving signals from the TP 702 above that threshold would not transmit the synchronization signals no matter what, whereas the UEs 704 (e.g., UE2) receiving signals from the TP below that threshold are allowed to transmit the synchronization signals. FIG. 7 shows an example of such a threshold. Based on the zone 706 determined by the threshold, UE 2 scans while UE3 does not.

Returning now to FIG. 2, with respect to UE 210 configuration, in an embodiment the TP 202, 204 configures an in-coverage UE 210 to start/stop being a sync source based on the UE reports, instead of having the UE 210 autonomously deciding to become a synchronization source. This requires further signalling, and having the UE 210 providing some reporting to the TP 202, 204.

FIG. 9 illustrates an embodiment procedure 900 for turning on/off of UEs as synchronization sources. When receiving an out-of-coverage (OOC) sync signal, a UE can report it to the TP. If, at block 902, the TP does not receive the indication from the UE that the UE has received the OOC sync signal, the procedure 900 ends. However, if, at block 902, the TP receives the indication from the UE that the UE has received the OOC sync signal, then the procedure 900 proceeds to block 904 where, upon receiving this message, the TP decides if this particular UE is to become a synchronization source. Note that in many cases, more than one UE will be able to detect the out-of-coverage synchronization signal. The TP may decide which one to configure by, e.g., selecting the UE receiving the out-of-coverage synchronization signal with the strongest received signal strength. If, at block 904, the TP decides to configure the UE as a synchronization source, then the procedure 900 proceeds to block 906 where the TP notifies the UE of the transmit decision, for instance using RRC signalling. The message may contain a physical synchronization source ID (PSSID), a starting subframe index, and a duration for how long the UE has to be a synchronization source.

Figure 10:
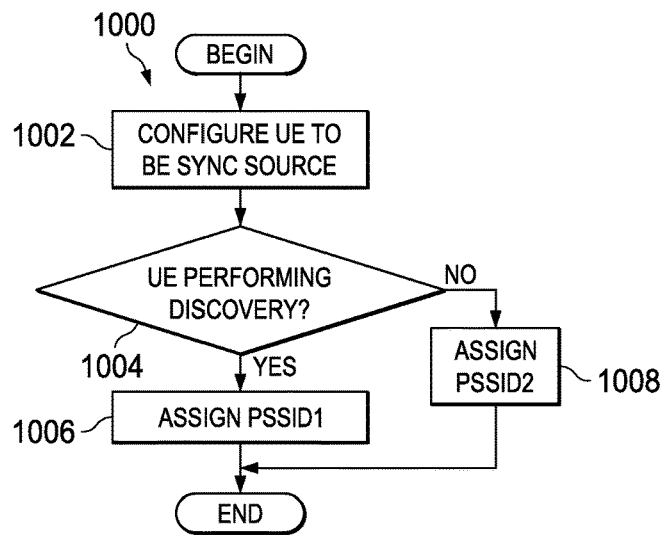
FIG. 10 illustrates an embodiment TP procedure for assigning and configuring a UE to be a sync source.

The sequence (obtained based on the PSSID) may be the same or different for communication and discovery operations. The procedure 1000 when assigning two PSSIDs is shown in FIG. 10. The procedure 1000 begins at block 1002 where the TP configures a UE to be a sync source. At block 1004, the TP determines if the UE is performing discovery. If, at block 1004, the TP determines that the UE is performing discovery, then the procedure 1000 proceeds to block 1006 and proceeds to block 1008 otherwise. At block 1006, the TP assigns PSSID1 to the UE, after which, the procedure 1000 ends. If the procedure proceeds to block 1008, then the TP assigns PSSID2 to the UE, after which, the procedure 1000 ends.

Differentiating between sync transmissions by a UE doing communication or discovery can give the receiving UE an idea about the accuracy of the sync signal. For example, if all discovery UEs in a cell transmit the same sync signal in the same time-frequency resource, the combined signal may have (undesired) properties that make it difficult to be differentiated from a sync signal transmitted by a communication UE.

Figure 11:
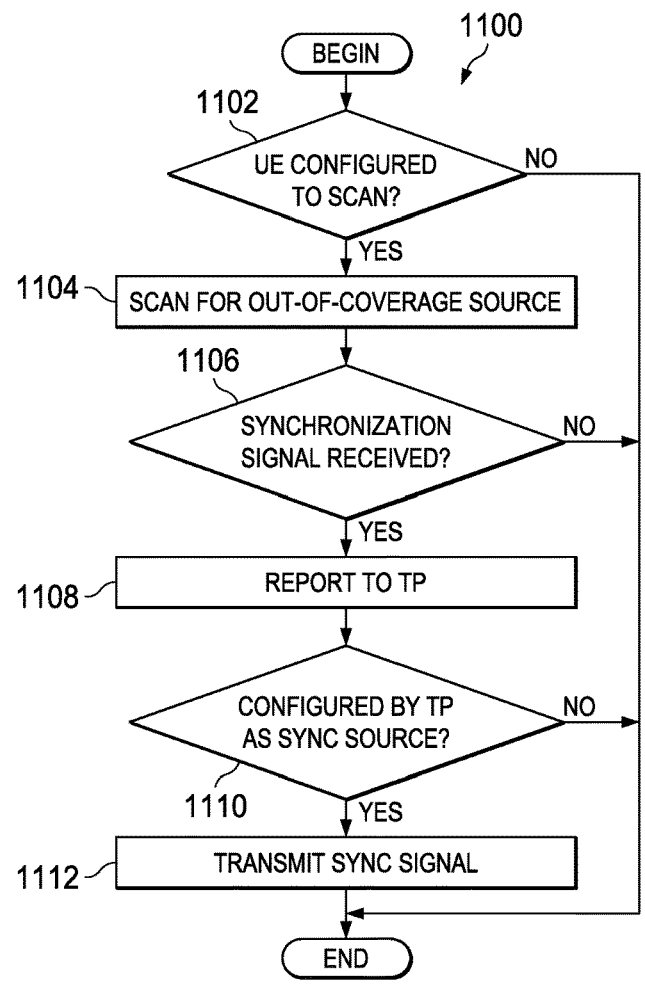
FIG. 11 illustrates an embodiment of an overall in-coverage UE procedure.

With respect to in-coverage UE procedures for becoming a synchronization source, the in-coverage UE performs four operations: scanning, reporting, configuration, and D2DSS transmission. An embodiment of the overall in-coverage UE procedure 1100 is shown in FIG. 11. The procedure 1100 begins at block 1102 where the UE determines if it is configured to scan and, if not, the procedure 1100 ends. If, at block 1102, the UE determines that it is configured to scan, the procedure 1100 proceeds to block 1104 where the UE scans for out-of-coverage sources. During the scanning phase, the UE monitors for out-of-coverage synchronization signals. At block 1106, the UE determines if a synchronization signal has been received and, if not, the procedure 1100 ends. If, at block 1106, the UE determines that a synchronization signal has been received, the procedure 1100 proceeds to block 1108 where the UE reports to the TP. For reporting, the UE sends a measurement report to the TP about the received out-of-coverage synchronization signal(s). At block 1110, the UE determines if it has been configured by the TP as the sync source and, if not, the procedure 1100 ends. If, at block 1110, the UE determines that it has been configured by the TP as the sync source, the procedure 1100 proceeds to block 1112 where the UE transmits a sync signal, after which, the procedure 1100 ends.

For configuration, the UE receives the configuration command from the TP to become a synchronization source.

For D2DSS transmission, the UE transmits the synchronization signal for a given duration of time (signaled by TP or pre-determined), or until instructed not to do so by the TP.

Each of these sub-operations is described in detail in the following sections.

An embodiment of the scanning operation 1200 is shown in FIG. 12. First, at block 1202, the UE gets the D2DSS configuration for scanning. This configuration may be pre-configured and a priori known by the UE, or may be sent by the TP, e.g. in a SIB message.

Second, at block 1204, the UE checks whether it is in the edge of network coverage by performing some power measurements. The power measurements may be, for instance, based on cell-specific reference signal (CRS) power measurements. If, at block 1204, the UE determines that it is not at the edge of coverage, the operation 1200 ends. If the UE is in edge of coverage, the operation 1200 proceeds to block 1206 where the UE then starts scanning for D2DSS. In an embodiment, this operation is optional.

In addition, other alternative solutions are possible to decide whether to scan or not. For example, FIG. 13 illustrates an alternative embodiment UE procedure 1300 for determining whether to scan or not. The procedure 1300 begins at block 1302 where the UE obtains the D2DSS configuration from the TP. At block 1304, the UE determines whether to scan during the scanning period. If the UE determines, at block 1304, not to scan, then the procedure 1300 ends. If, at block 1304, the UE determines to scan during the scanning period, then the procedure 1300 proceeds to block 1306 where the UE scans for D2DSS, after which, the procedure 1300 ends. In an embodiment, there are two alternative solutions for performing block 1304, which are described below.

The first alternative is probabilistic determination. In this case, the UE decides to scan with a given probability. The probability can be a priori known (e.g., fixed in the standard specification), or can be communicated to the UE by higher layer signaling (e.g., a SIB message). This can be useful to help UEs in coverage holes which might be close to the cell center. The probability can be a function of reference signal received power (RSRP) of the serving TP to further enhance performance.

The second alternative is subset transmission. The UE decides to scan based on e.g., the subframe index (or radio frame, scanning period index, or a combination of them) and the UE ID. Once a UE decides to scan, it may scan for duration of time, similar to "T2" in FIG. 5.

FIG. 14 illustrates an embodiment UE procedure 1400 for reporting to the TP. The procedure 1400 begins at block 1402 where the UE scans for D2DSS. At block 1404, if a scanning UE finds a source, the procedure 1400 proceeds to block 1406 where the UE reports back to its serving TP, after which, the procedure 1400 ends. In an embodiment, the RSSI of found D2DSS(s) must be greater than a threshold, Thr1, in order to report. If, at block 1404, the scanning UE does not find a source, then the procedure 1400 ends. For sending such a report, an idle UE becomes RRC_CONNECTED and then reports to the TP. The report can be sent using higher layer signaling (as a media access control (MAC) control element (CE), RRC). If the UE finds multiple sync signals (e.g., from D2DSSue_oon set), the UE may select a subset or the whole set to report back.

Alternatively, an idle UE based on some measurements or probability rules may become a synchronization source.

The content of the report can be one or more of the following:

Indication of the detection of an SS (1-bit flag).
A function of the sequence it received (e.g., sequence index).
A function of RSSI of the detected SS(s).
Synchronization source ID.
Timing/frequency of the detected SS(s), i.e., when/where the UE received the SS(s) (such as a reference subframe index corresponding to D2DSS detection of the out of coverage (OOC) SS).
D2DSS frequency transmission.

It is quite possible that a large number of UEs will detect the synchronization source. To avoid many nearby in-coverage UEs to report the same found D2DSS(s), various approaches are possible.

Figure 15:
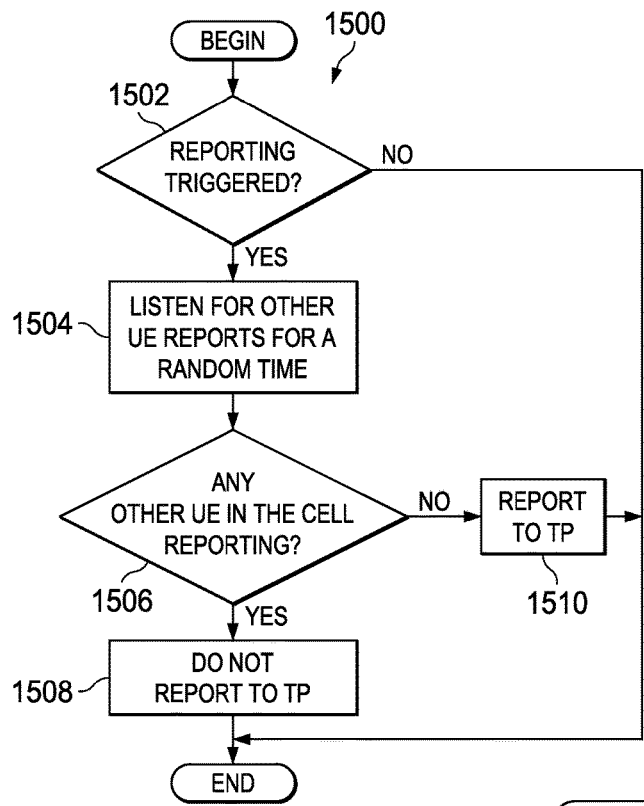
FIG. 15 illustrates a first embodiment UE procedure to determine when reporting is triggered.

FIG. 15 illustrates a first embodiment UE procedure 1500 for determining when to report. The procedure 1500 begins at block 1502 where the UE determines if reporting is triggered (e.g., the UE detects a SS). If reporting is not triggered at block 1502, then the procedure 1500 ends. However, if, at block 1502, reporting is triggered, then the procedure 1500 proceeds to block 1504. In this first approach, at block 1504, each in-coverage UE detecting an SS uses a random period for assessing whether another nearby in-coverage UE reporting detected SSs. The UE listens for other reports by other UEs. At block 1506, if the UE found another UE reporting the same out-of-coverage source, the procedure 1500 proceeds to block 1508 where the UE may refrain from sending the report to the TP to not waste UL resources for the detection of the same source. If, at block 1506, the UE does not detect any other UE in the cell reporting, then the procedure 1500 proceeds to block 1501 where the UE reports to the UE, after which, the procedure 1500 ends. In an embodiment, the report should be detectable by other UEs. In an embodiment, only D2D enabled UEs may be able to understand the report.

Figure 16:
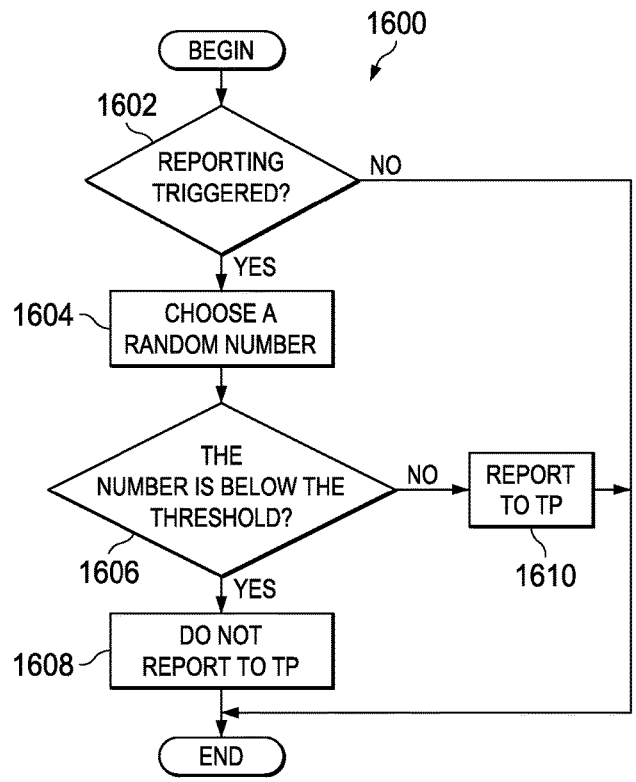
FIG. 16 illustrates a second embodiment UE procedure to determine when reporting is triggered.

FIG. 16 illustrates a second embodiment UE procedure 1600 for determining when to report. The procedure 1600 begins at block 1602 where the UE determines if reporting is triggered (e.g., the UE detects a SS). If reporting is not triggered at block 1602, then the procedure 1600 ends. However, if, at block 1602, reporting is triggered, then the procedure 1600 proceeds to block 1604. In the second approach, each in-coverage UE detecting a SS may report with a probability (preconfigured or configured). Thus, at block 1604, the UE chooses a random number. At block 1606, the UE determines if the random number selected is below a threshold. If, at block 1606, the random number is not below the threshold, then the procedure 1600 proceeds to block 1608 where the UE may refrain from sending the report to the TP, after which, the procedure 1600 ends. If, at block 1606, the random number selected is below the threshold, then the procedure 1600 proceeds to block 1610 where the UE reports to the TP, after which, the procedure 1600 ends.

Figure 17:
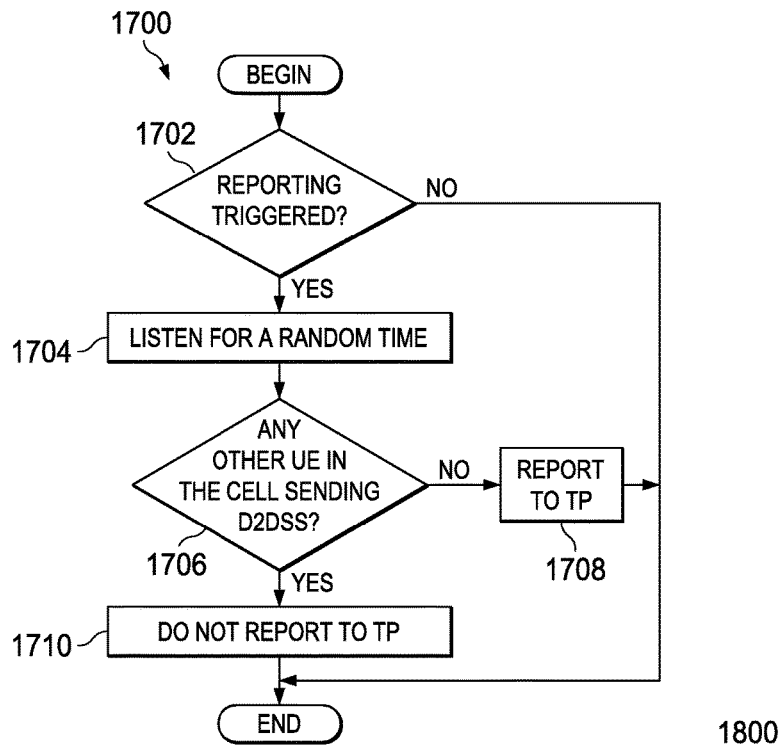
FIG. 17 illustrates a third embodiment UE procedure to determine when reporting is triggered.

FIG. 17 illustrates a third embodiment UE procedure 1700 for determining when to report. The procedure 1700 begins at block 1702 where the UE determines if reporting is triggered (e.g., the UE detects a SS). If reporting is not triggered at block 1702, then the procedure 1700 ends. However, if, at block 1702, reporting is triggered, then the procedure 1700 proceeds to block 1704. In this third approach, at block 1704, each in-coverage UE detecting an SS may wait for a random period of time and, at block 1706, if it has not received any D2DSS from the cell it belongs to or a set of cells (whose IDs are detected by PSS/SSS detection or the related information is implicitly obtained by broadcast signal from serving cell) in such a period, the procedure 1700 proceeds to block 1708 where the UE reports to TP its detection of an SS, after which, the procedure 1700 ends. If, at block 1706, the UE detects another UE in the cell sending D2DSS, then the procedure 1700 proceeds to block 1710 where the UE refrains from reporting to the TP, after which, the procedure 1700 ends.

Figure 18:
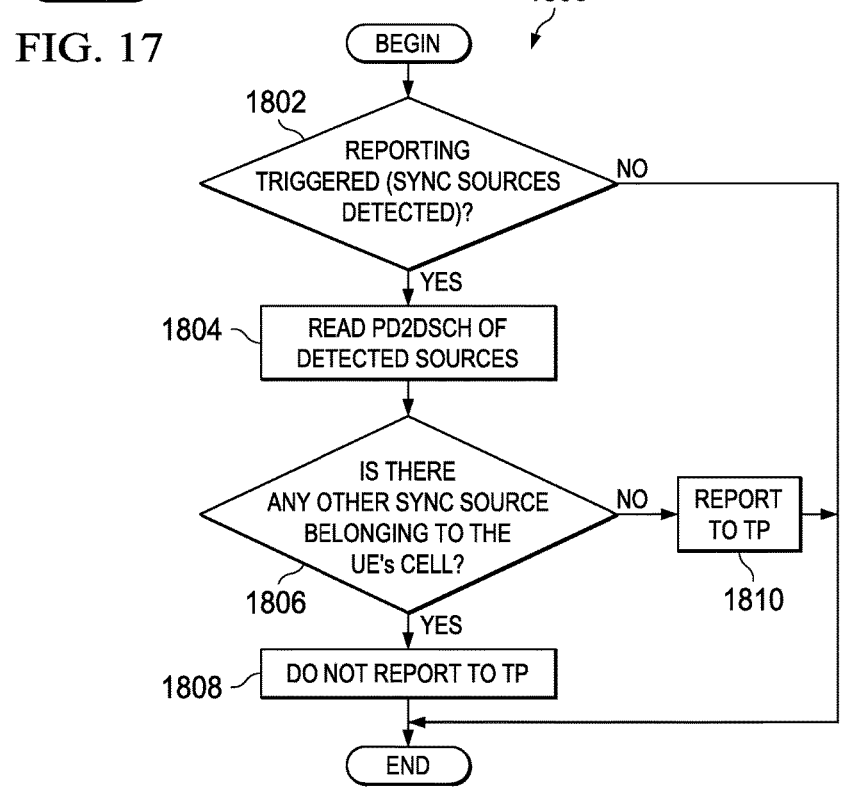
FIG. 18 illustrates a fourth embodiment UE procedure to determine when reporting is triggered.

FIG. 18 illustrates a third embodiment UE procedure 1800 for determining when to report. The procedure 1800 begins at block 1802 where the UE determines if reporting is triggered (e.g., the UE detects a SS). If reporting is not triggered at block 1802, then the procedure 1800 ends. However, if, at block 1802, reporting is triggered, then the procedure 1800 proceeds to block 1804. At block 1804, in this fourth approach, each in-coverage UE detecting an SS may read the corresponding physical D2D synchronization channel (PD2DSCH) and, at block 1806, determine if there is a need to become a synchronization source and/or report to the network. The PD2DSCH corresponding to an SS may carry some information about (a subset of) sequences the SS already detected. Such information could include the cell-ID or sequence index associated with the SSs. If, at block 1806, there is no need to report because there are other sync sources belonging to the UE's cell, then the procedure 1800 proceeds to bock 1808 where the UE refrains from reporting to the TP, after which, the procedure 1800 ends. If, at block 1806, the UE determines that there are no other sync sources belonging to the UE's cell, then the procedure 1800 proceeds to block 1810 where the UE reports to the TP, after which, the procedure 1800 ends.

As an example in FIG. 2, UE 6 may be configured as an SS for discovery purpose in an asynchronous network. Once UE 2 receives the D2DSS corresponding to UE 6 it reads the associated PD2DSCH and finds out that UE 6 has already received a D2DSS from the cell UE 2 belongs to. Therefore, UE 2 doesn't report to its TP nor becomes a synchronization source.

Note that the difference between the first and third alternatives is that, in alternative 1, UEs search for potential reports sent by other UEs, whereas in alternative 3, UEs search for potential D2DSS(s) sent by other UEs. It is also possible that all UEs detecting an SS report back to the network and then the network decides who becomes an SS.

Figure 19:
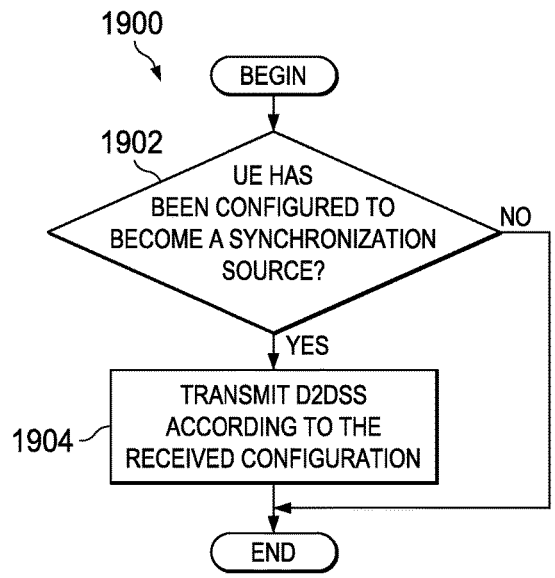
FIG. 19 illustrates an embodiment UE procedure to act according to a configuration command from a TP.

With respect to configuration, FIG. 19 illustrates an embodiment UE operation 1900 to act according to configuration command from TP. The UE receives the configuration from the TP. If, at block 1902, the UE determines that the TP has not configured the UE to become an SS, then the procedure 1900 ends. If, at block 1902, the UE determines that the TP has configured a UE to become an SS (e.g., by higher layer signaling such as dedicated RRC), the procedure 1900 proceeds to block 1904 where the UE transmits a D2DSS from a D2DSSue_net, after which, the procedure 1900 ends. The sequence may be signaled to the UE (preferred approach as gives full flexibility and control to the network). Alternatively, the UE may select a D2DSS from D2DSSue_net according pseudo randomly (e.g., based on one or more of UE-ID, cell-ID, subframe index, etc.).

Figure 20:
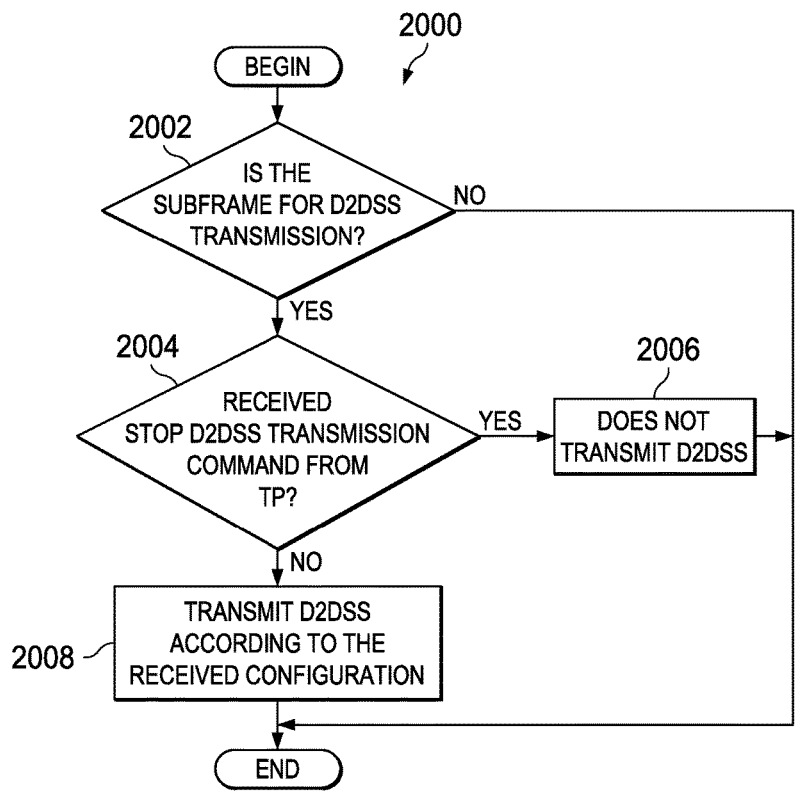
FIG. 20 illustrates an embodiment UE procedure for D2DSS transmission.

For D2DSS transmission, the UE transmits a synchronization signal according to the configuration received from TP. FIG. 20 illustrates an embodiment UE procedure 2000 for D2DSS transmission. The procedure 2000 begins at block 2002 where the UE determines if the subframe is for D2DSS transmission and, if not, the procedure 2000 ends. If, at block 2000, the UE determines that the subframe is for D2DSS transmission, then the procedure 2000 proceeds to block 2004 where the UE determines if it has received a "stop D2DSS transmission" command from the TP and, if yes, then the procedure 2000 proceeds to block 2006 where the UE refrains from transmitting the D2DSS, after which, the method ends. If, at block 2004, the UE determines that it has not received a stop D2DSS transmission command from the TP, then the procedure 2000 proceeds to block 2008 where the UE transmits the D2DSS according to the received configuration, after which, the method 2000 ends. Generally, this procedure 2000 works most of the time. However, there are some cases where the OOC UE may have a frame-aligned D2DSS transmission with an in-coverage (IC) UE. This happens for instance when the OOC UE initially synchronized with the network; it continued transmission with the same timing, being roughly synchronized with the network. When it comes back close to coverage, it will then have D2DSS transmissions roughly at the same time as the IC UE, thus won't be able to detect the IC D2DSS transmission due to the half-duplex issue. Some solutions to address this case are provided below, and shown in FIGS. 21A-C with, for example, D2DSS transmissions of 40 millisecond (ms) periodicity.

Figure 21A:
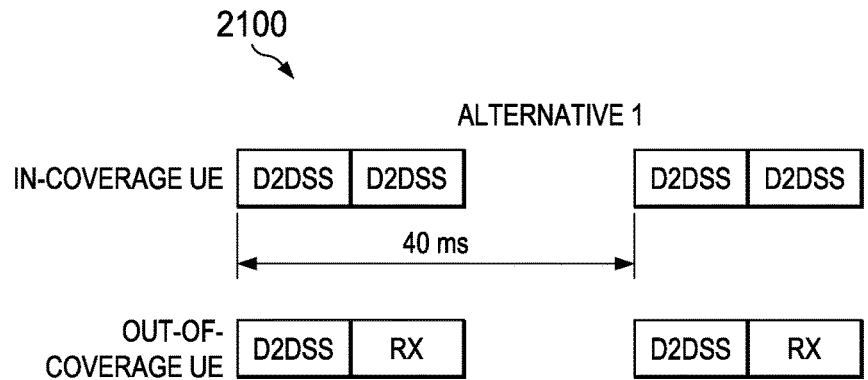
FIGS. 21A-C illustrate alternative embodiments for removing transmission pattern alignment of in and out of coverage D2DSSs.

In a first alternative 2100 shown in FIG. 21A, have a longer sequence period (maybe concatenating the existing sequence) for in-coverage sources. In this manner, the IC and OOC signals will not always collide, thus giving the chance for the OOC UE to receive the IC D2DSS.

Figure 21B:
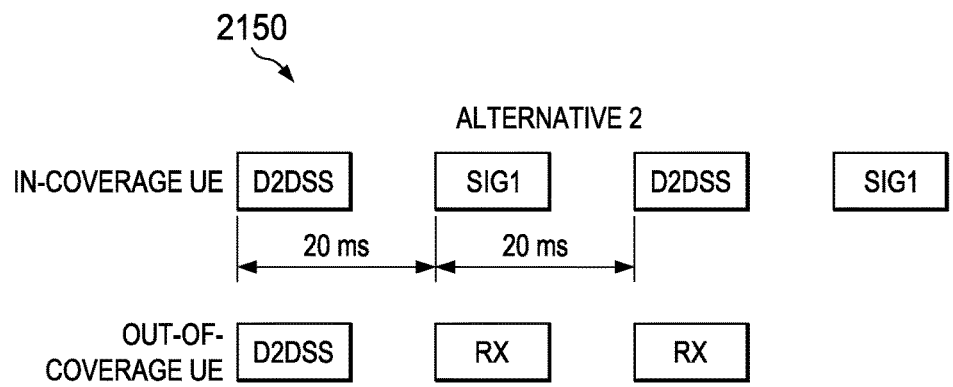
Figure 22:
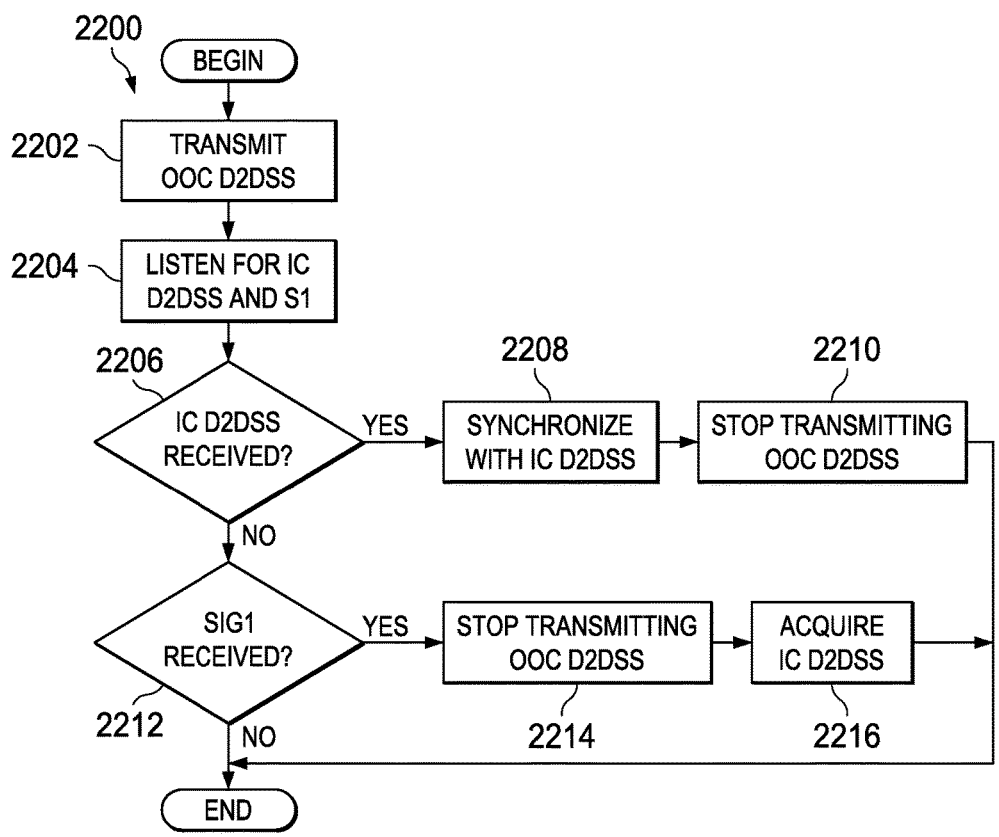
FIG. 22 illustrates an embodiment UE procedure for processing Sig1 (OOC UE)

In a second alternative 2150 shown in FIG. 21B, have the same sequence length/timing but have some signals (shown as Sig1 in FIG. 21B) transmitted at a different time instance indicating that the in-coverage UE is an in-coverage source of D2DSS transmissions. If the OOC UE detects this signal, it knows that an IC UE has become a synchronization source, thus can cease to transmit the D2DSS and get the synchronization from the IC UE. The operation for the OOC UE is shown in FIG. 22 and described below. Note that the Sig1 transmission from the IC UE only needs to be temporary, when the IC UE starts transmitting the D2DSS. It may just occur for a few cycles.

Figure 21C:
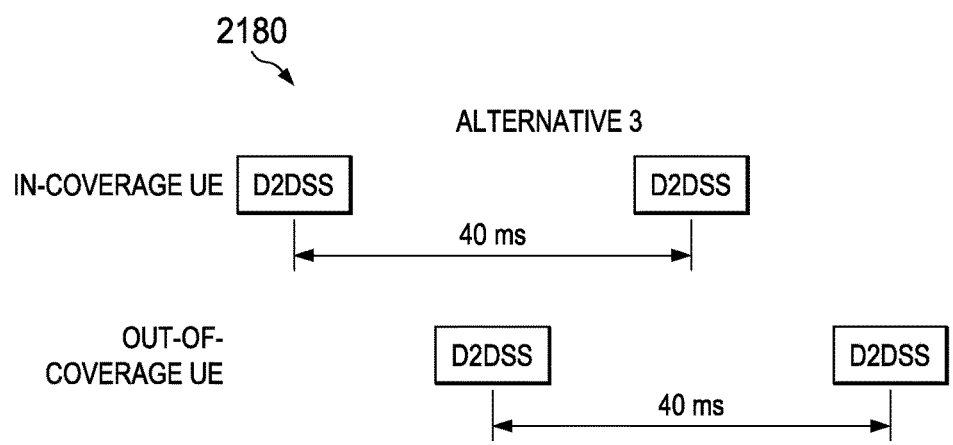

In a third alternative 2180 shown in FIG. 21C, the in-coverage UE reports a time indication of when the D2DSS signal was received to the detected D2DSS. The time indication could be sent in a reference subframe index corresponding to D2DSS detection of the OOC SS. The TP may use this report to ensure D2DSS transmission of the in-coverage UE does not have a large overlap in time with D2DSS transmission of the detected out-of-coverage UE. As a result, OOC UE would have opportunities to listen to the in-coverage D2DSS.

FIG. 22 illustrates an embodiment UE procedure 2200 for processing Sig1 (OOC UE). The procedure 2200 begins at block 2202 where the UE transmits the OOC D2DSS. At block 2204, the UE listens for the IC D2DSS and S1. At block 2206, the UE determines if the IC D2DSS has been received and, if yes, the procedure 2200 proceeds to block 2208 where the UE synchronizes with the IC D2DSS. At block 2210, the UE stops transmitting the OOC D2DSS, after which, the procedure 220 ends. If, at block 2206, the UE determines that the IC D2DSS has not been received, then the procedure 2200 proceeds to block 2212 where the UE determines if the Sig1 has been received and, if not, the procedure 2200 ends. If, at block 2212, the UE determines that the Sig1 has been received, then the procedure 2200 proceeds to block 2214 where the UE stops transmitting the OOC D2DSS. At block 2216, the UE acquires the IC D2DSS, after which, the procedure 2200 ends.

With respect to procedures for in-coverage UE becoming an SS for asynchronous inter-cell D2D, the UE procedures described above are feasible/similar for inter-cell D2D (both communications and discovery) in case of asynchronous cells.

Figure 23:
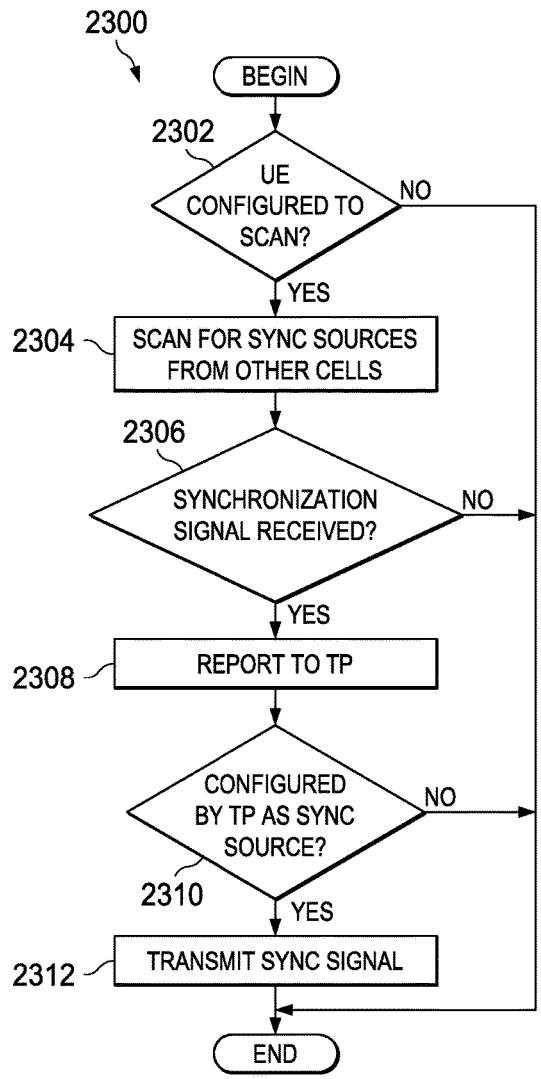
FIG. 23 illustrates an embodiment of an overall in-coverage UE procedure for asynchronous cells.

FIG. 23 illustrates an embodiment of the overall procedure 2300 for in-coverage UE becoming an SS for asynchronous inter-cell D2D. The procedure 2300 begins at block 2302 where the UE determines whether the TP has configured the UE to scan and, if not, the procedure 2300 ends. If, at block 2302, the UE determines that the TP has configured the UE to scan, then the procedure 2300 proceeds to block 2304 where the UE scans for sync sources from other cells. At block 2306, the UE determines if a synchronization signal has been received and, if not, the procedure 2300 ends. If, at block 2306, the UE determines that a synchronization signal has been received, then the procedure 2300 proceeds to block 2308 where the UE reports to the TP. At block 2310, the UE determines if the UE has been configured by the TP as a sync source and, if not, the procedure 2300 ends. If, at block 2310, the UE determines that the UE has been configured by the TP as a sync source, then the procedure 2300 proceeds to block 2312 where the UE transmits a sync signal, after which, the procedure 2300 ends.

In each cell, a UE detects D2DSS corresponding to UEs in another cell (assuming the PSSID corresponding to the D2DSS transmissions are cell-specific) instead of D2DSS corresponding to an ISS and reports back to the network such detections. If the TP configures a UE to become an SS, the UE becomes such. The D2D discovery/SA/data communication transmissions of a UE are based on the timing of its serving cell.

Figure 24:
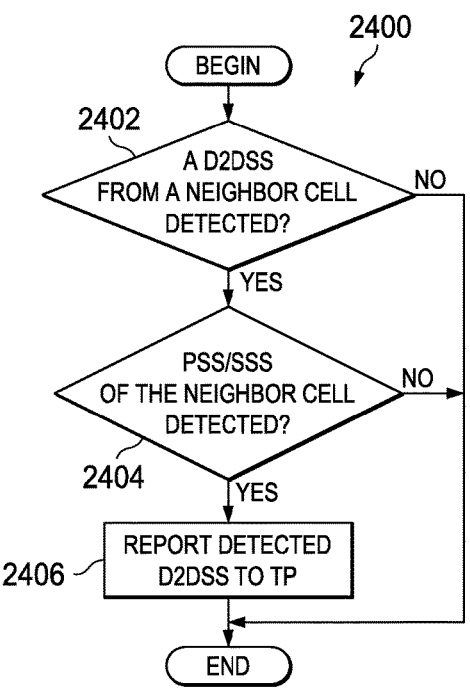
FIG. 24 illustrates an embodiment UE procedure for determining if a D2DSS detection report is triggered.

Some alternatives may be possible for the inter-cell case as shown in FIG. 24 which illustrates an embodiment UE procedure 2400 for determining if a D2DSS detection report is triggered. The procedure 2400 begins at block 2402 where the UE determines if a D2DSS from a neighbor cell has been detected and, if not, the procedure 2400 ends. If, at block 2402, a D2DSS from a neighbor cell has been detected, the procedure 2400 proceeds to block 2404 where the UE determines if the PSS/SSS of the neighbor cell has been detected and, if not, the procedure 2400 ends. If, at block 2404, the UE determines that the PSS/SSS of the neighbor cell has been detected, then the procedure 2400 proceeds to block 2406 where the UE reports the detected D2DSS to the TP, after which, the procedure 2400 ends.

As an alternative to the procedures for becoming an SS mentioned above, if a UE does not find information regarding on which time resources and sequences the UE should monitor for PD2DSS and SD2DSS, and also if the UE is not able to detect PSS/SSS of neighbor cells, the UE will not become an SS and/or will not request to be an SS.

As an example, the neighbor cell to $s_1$ may not allocate any resources for discovery transmissions (yet reception is possible), so the reception pool may not contain the information (implicitly or explicitly) on which time resources and sequences UE should monitor for PD2DSS and SD2DSS if transmission of PD2DSS and SD2DSS is configured. In such a case, if $s_1$ has not detected PSS/SSS of the neighbor cell, it won't try to become an SS, even though transmitting D2DSS is useful for $s_7$ to be able to discover $s_1$. One reason is $s_1$ probably won't reach that many UEs in the cell serving $s_7$ and therefore should not be an SS.

Figure 25:
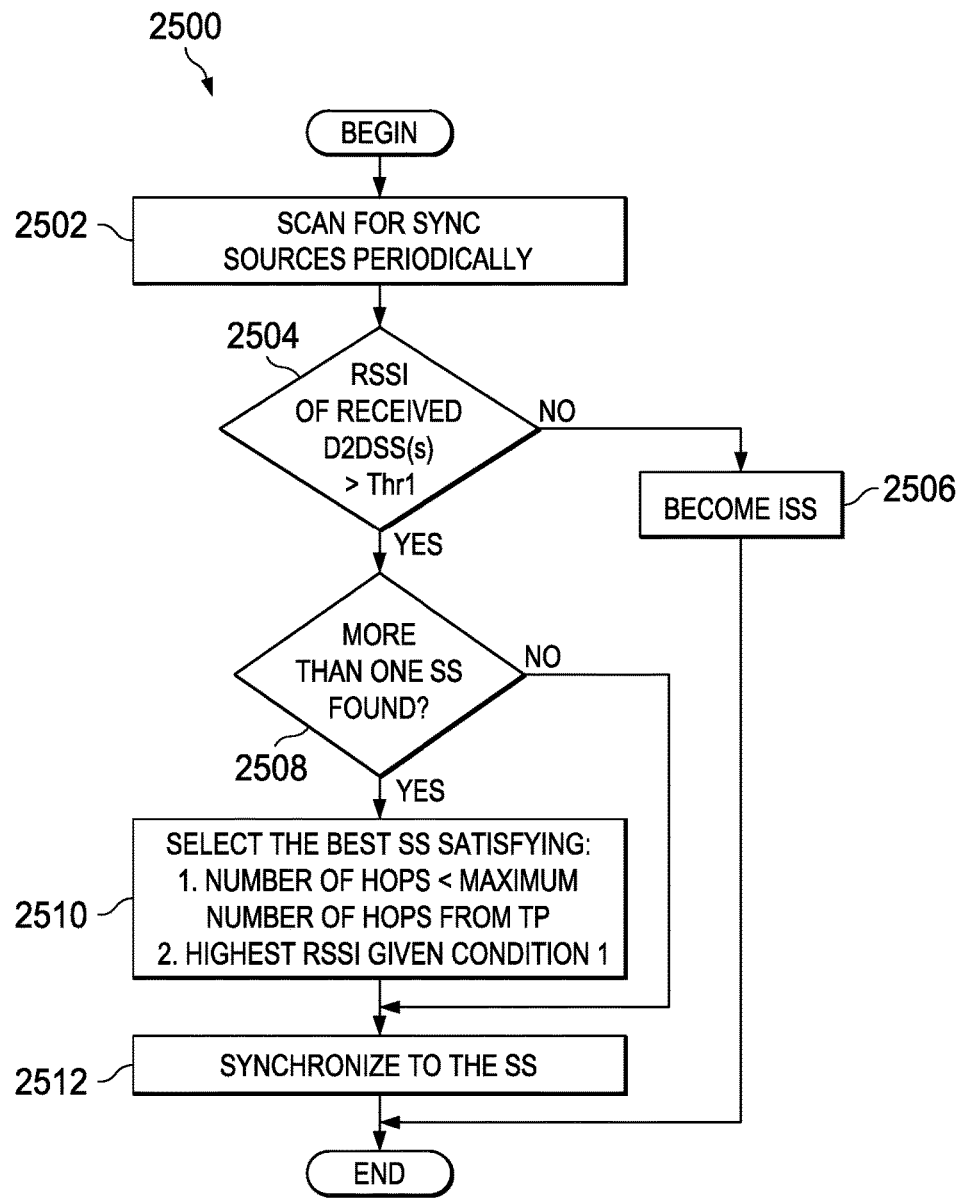
FIG. 25 illustrates an embodiment procedure for an OOC UE to become an SS.

With respect to procedures for out-of-coverage UE becoming an SS, when an out-of-coverage UE cannot listen to an in-coverage UE, it may become an independent synchronization source under the condition that it has not received a strong synchronization signal from other UEs. The synchronization procedure for this scenario is similar to that discussed above, with the difference that no reporting to and configuration from TP are involved. The general procedure consists of two steps: scanning and D2DSS transmission. The overall procedure is shown in FIG. 25 which illustrates an embodiment procedure for an OOC UE to become an SS. During the scanning phase, the UE monitors for synchronization signals. For D2DSS transmission, the UE transmits the synchronization signal for a given duration of time (e.g., preconfigured or till it has data to send). The procedure 2500 begins at block 2502 where the UE scans for sync sources periodically. At block 2504, the UE determines if the RSSI of a received D2DSS(s) is greater than a threshold, Thr1 and, if not, the procedure 2500 proceeds to block 2506 where the UE becomes the ISS, after which, the procedure 2500 ends. If, at block 2504, the UE determines that the RSSI of the received D2DSS(s) is not greater than the threshold, Thr1, the procedure 2500 proceeds to block 2508. At block 2508, the UE determines if more than one SS has been found and, if yes, the procedure 2500 proceeds to block 2510 where the UE selects the best SS satisfying: 1) a number of hops is less than a maximum number of hops from the TP and 2) the highest RSSI given condition 1, after which, the procedure 2500 proceeds to block 2512. If, at block 2508, the UE determines that more than one SS has not been found, then the procedure 2500 proceeds to block 2512 where the UE synchronizes to the SS, after which, the procedure 2500 ends.

Figure 26:
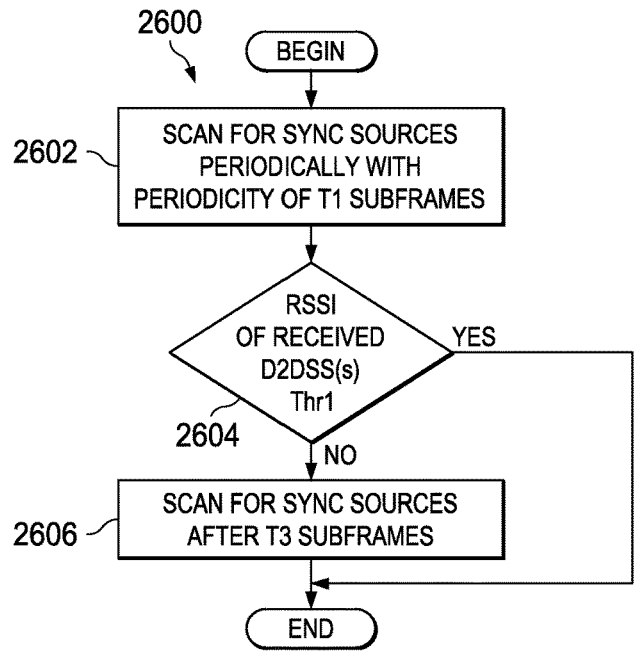
FIG. 26 illustrates an embodiment OOC UE procedure for scanning.

FIG. 26 illustrates an embodiment of the scanning procedure 2600 for an OOC UE. The procedure 2600 begins at block 2602 where the UE scans for sync sources periodically with a periodicity of T1 subframes. At block 2604, the UE determines if the RSSI of the received D2DSS(s) is greater than a threshold, Thr1, and, if yes, the procedure 2600 ends. If, at block 2604, the RSS of the received D2DSS(s) is not greater than the threshold, Thr1, the procedure 2600 proceeds to block 2606 where the UE scans for sync sources after T3 subframes, after which, the procedure 2600 ends.

Figure 27:
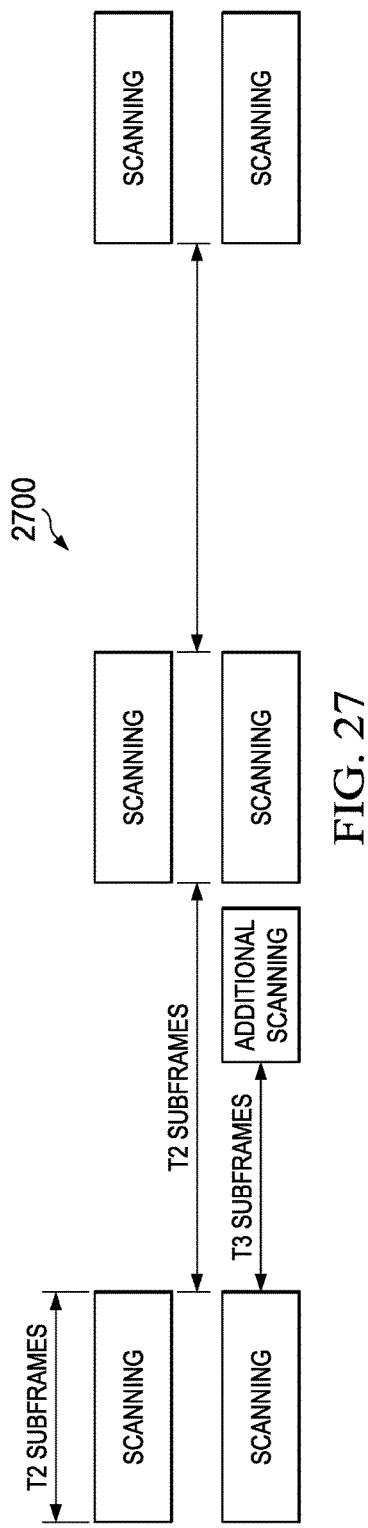
FIG. 27 illustrates an embodiment OOC UE scanning for sync sources including an additional scanning phase.

FIG. 27 illustrates an embodiment system 2700 for OOC UE scanning for sync sources including an additional scanning phase.

An OOC UE periodically (e.g., every T1 subframes as shown in FIG. 26 and FIG. 27) monitors D2DSS transmissions for duration of T2 subframes to obtain synchronization. If it has not found a strong synchronization signal, it is likely that this UE becomes an ISS. However, to avoid having neighbor UEs become sync sources, the UE goes to an additional (not periodic) scanning phase after T3 subframes as shown in FIGS. 27. T1, and T2 are preconfigured (fixed) and T3 is (pseudo) random (e.g., obtained based on the UE-ID).

Note that neighbor ISSs may not be able to detect each other due to the half-duplex issue (i.e., they may transmit and receive almost at the same time). So, introducing such additional scanning (cf. FIG. 27) with randomness is useful.

An alternative to having T2 fixed and T3 random is to have T2 random and T3 fixed.

Figure 28:
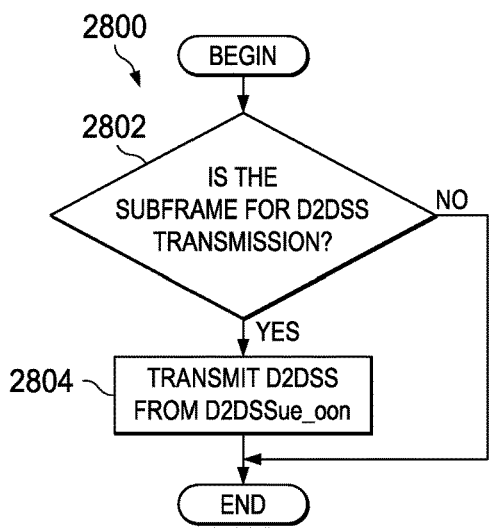
FIG. 28 illustrates an embodiment OOC UE procedure for D2DSS transmission.

For D2DSS transmission, once a UE has become an ISS, it transmits a D2DSS from the preconfigured set of D2DSSue_oon sequences. FIG. 28 illustrates an embodiment of this OOC UE procedure 2800 for D2DSS transmission. The procedure 2800 begins at block 2802 where the UE determines if the subframe for D2DSS transmission and, if not, the procedure 2800 ends. If, at block 2800, the subframe is for D2DSS transmission, then the procedure 2800 proceeds to block 2804 where the UE transmits the D2DSS from D2DSSue_oon, after which, the procedure 2800 ends.

Figure 29:
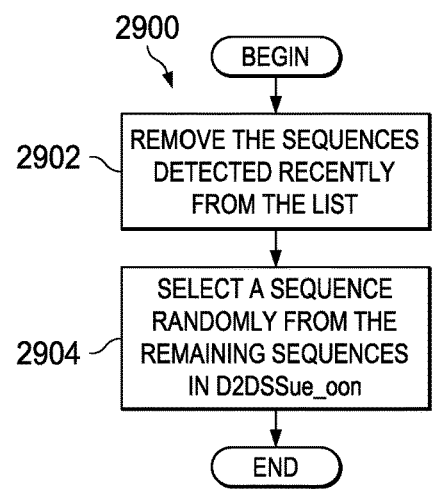
FIG. 29 illustrates an embodiment OOC UE procedure to select D2DSS for transmission.

The UE needs to know when and which sequence to transmit. The sequence can be chosen randomly (e.g., based on UE-ID) from the set. The UE may remove some of the latest sequences it has detected from the list and then randomly select one from the remaining sequences to potentially avoid interfering with other sources as shown in FIG. 29, which illustrates an embodiment OOC UE procedure 2900 to select D2DSS for transmission. The procedure 2900 begins at block 2902 where the UE removes the sequences detected recently from the list. At block 2904, the UE selects a sequence randomly from the remaining sequences in D2DSSue_oon, after which, the procedure 2900 ends.

The starting subframe for D2DSS transmission can be Q subframes after the last subframe in the last scanning period, where Q can be preconfigured. In addition, Q may have some randomness among UEs to reduce the possibility of two neighbor out-of coverage UEs becoming synchronization sources at the same time. In such a case, Q can be a function of an ID associated to the UE or can be a random number among a set of possible numbers.

Figure 30:
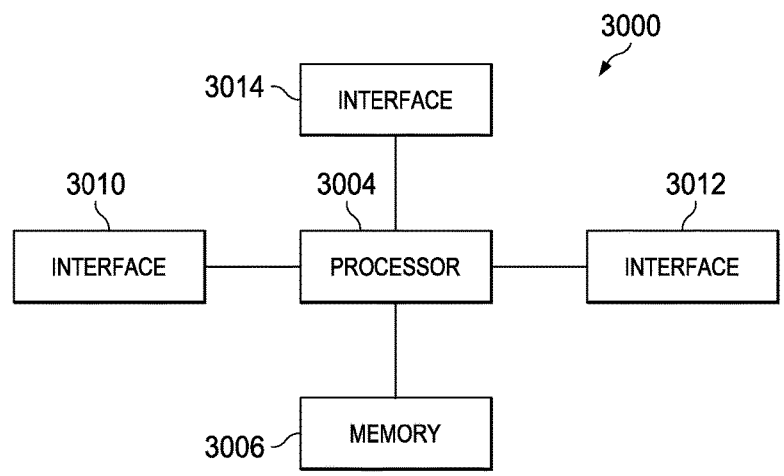
FIG. 30 illustrates a block diagram of an embodiment processing system for performing methods described herein, which may be installed in a host device.

FIG. 30 illustrates a block diagram of an embodiment processing system 3000 for performing methods described herein, which may be installed in a host device. As shown, the processing system 3000 includes a processor 3004, a memory 3006, and interfaces 3010-3014, which may (or may not) be arranged as shown in FIG. 30. The processor 3004 may be any component or collection of components adapted to perform computations and/or other processing related tasks, and the memory 3006 may be any component or collection of components adapted to store programming and/or instructions for execution by the processor 3004. In an embodiment, the memory 3006 includes a non-transitory computer readable medium. The interfaces 3010, 3012, 3014 may be any component or collection of components that allow the processing system 3000 to communicate with other devices/components and/or a user. For example, one or more of the interfaces 3010, 3012, 3014 may be adapted to communicate data, control, or management messages from the processor 3004 to applications installed on the host device and/or a remote device. As another example, one or more of the interfaces 3010, 3012, 3014 may be adapted to allow a user or user device (e.g., personal computer (PC), etc.) to interact/communicate with the processing system 3000. The processing system 3000 may include additional components not depicted in FIG. 30, such as long term storage (e.g., non-volatile memory, etc.).

In some embodiments, the processing system 3000 is included in a network device that is accessing, or part otherwise of, a telecommunications network. In one example, the processing system 3000 is in a network-side device in a wireless or wireline telecommunications network, such as a base station, a relay station, a scheduler, a controller, a gateway, a router, an applications server, or any other device in the telecommunications network. In other embodiments, the processing system 3000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 31:
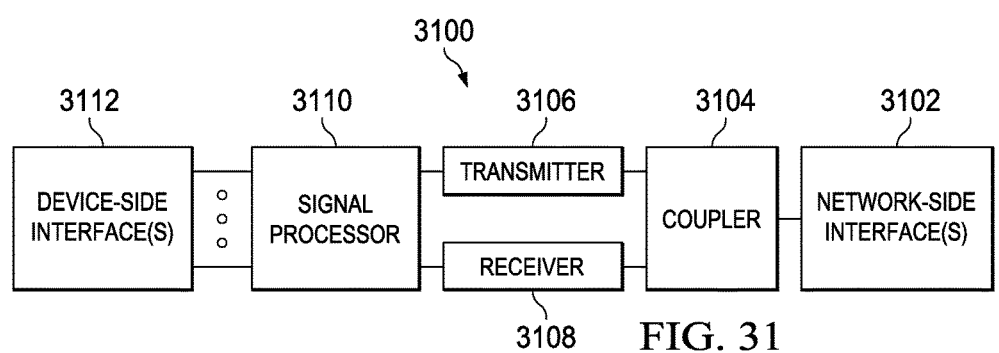
FIG. 31 illustrates a block diagram of a transceiver adapted to transmit and receive signaling over a telecommunications network.

In some embodiments, one or more of the interfaces 3010, 3012, 3014 connects the processing system 3000 to a transceiver adapted to transmit and receive signaling over the telecommunications network. FIG. 31 illustrates a block diagram of a transceiver 3100 adapted to transmit and receive signaling over a telecommunications network. The transceiver 3100 may be installed in a host device. As shown, the transceiver 3100 comprises a network-side interface 3102, a coupler 3104, a transmitter 3106, a receiver 3108, a signal processor 3110, and a device-side interface 3112. The network-side interface 3102 may include any component or collection of components adapted to transmit or receive signaling over a wireless or wireline telecommunications network. The coupler 3104 may include any component or collection of components adapted to facilitate bi-directional communication over the network-side interface 3102. The transmitter 3106 may include any component or collection of components (e.g., up-converter, power amplifier, etc.) adapted to convert a baseband signal into a modulated carrier signal suitable for transmission over the network-side interface 3102. The receiver 3108 may include any component or collection of components (e.g., down-converter, low noise amplifier, etc.) adapted to convert a carrier signal received over the network-side interface 3102 into a baseband signal. The signal processor 3110 may include any component or collection of components adapted to convert a baseband signal into a data signal suitable for communication over the device-side interface(s) 3112, or vice-versa. The device-side interface(s) 3112 may include any component or collection of components adapted to communicate data-signals between the signal processor 3110 and components within the host device (e.g., the processing system 3000, local area network (LAN) ports, etc.).

The transceiver 3100 may transmit and receive signaling over any type of communications medium. In some embodiments, the transceiver 3100 transmits and receives signaling over a wireless medium. For example, the transceiver 3100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 3102 comprises one or more antenna/radiating elements. For example, the network-side interface 3102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 3100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety:

[1] 3GPP RAN RP140518.
[2] U.S. patent application Ser. No. 13/406,266, entitled "System and Method for Allocating Network Resources," filed Feb. 27, 2012.
[3] U.S. patent application Ser. No. 13/406,455, entitled "System and Method for Time Resource Allocation for Device-to-Device Communication Overlaid on a Cellular Network," filed Feb. 27, 2012.

[4] R1-141926, "D2D Synchronization Procedure for In-coverage," Huawei, HiSilicon, RAN1#77, May 19-23, 2014.

[5] Chairman notes 3GPP RAN1#77.

An embodiment method for an in-coverage (IC) user equipment (UE) to become a synchronization source includes the IC UE scanning for out-of-coverage synchronization signals, reporting a measurement report to a TP in comprising information of one or more received out-of-coverage synchronization signals, configuring to become the synchronization source in response to a configuration command from the TP, and transmitting a device-to-device (D2D) synchronization signal for a duration of time or until instructed not to do so by the TP.

An embodiment IC UE includes a processor and a non-transitory computer readable storage medium storing programming for execution by the processor. The programming includes instructions to scan for out-of-coverage synchronization signals, report a measurement report to an TP in comprising information of one or more received out-of-coverage synchronization signals, configure the IC UE to become the synchronization source in response to a configuration command from the TP, and transmit a D2D synchronization signal for a duration of time or until instructed not to do so by the TP.

In a disclosed embodiment, a method in an in-coverage (IC) user equipment (UE) for the IC UE to become a synchronization source for out-of-coverage UEs for device-to-device (D2D) communication includes obtaining, by the IC UE, scanning parameters; scanning, by the IC UE, for out-of-coverage synchronization signals; transmitting, by the IC UE, a measurement report to a Transmission Point (TP) in response to a report trigger, the measurement report comprising information of one or more received out-of-coverage synchronization signals; receiving, by the IC UE, a configuration command from the TP instructing the IC UE to become a synchronization source; and transmitting, by the IC UE, a device-to-device (D2D) synchronization signal (SS) for a duration of time or until instructed not to do so by the TP. In an embodiment, the scanning parameters are preconfigured. In another embodiment, the scanning parameters are received in a broadcast message. In an embodiment, the scanning parameters include T1, T2, and T3, wherein T1 is a time gap between scanning windows, T2 is a length of time of the scanning window, and T3 is a total length of time for scanning. The method may also include refraining from configuring the IC UE to become the synchronization source in response to a configuration command from the TP establishing a different IC UE as the synchronization source; and refraining from transmitting the D2D synchronization signal. In an embodiment, the method also include listening, by the IC UE, for measurement reports from other UEs for a listening time; refraining, by the IC UE, from transmitting the measurement report when the IC UE determines that another UE has transmitted the measurement report during the listening time; and transmitting, by the IC UE, the measurement report to the TP when the UE determines that no other UE has transmitted the measurement report during the listening time. In an embodiment, the listening time is a random time. In an embodiment, the method includes selecting, by the UE, a random number; and refraining from transmitting, by the IC UE, the measurement report when the random number is less than a predetermined threshold. In an embodiment, the method includes listening, by the IC UE, for the D2DSS from other UEs for a listening time; refraining, by the IC UE, from transmitting the measurement report when the IC UE determines that another UE has transmitted the D2DSS during the listening time; and transmitting, by the IC UE, the measurement report to the TP when the UE determines that no other UE has transmitted the D2DSS during the listening time. In an embodiment, the method includes reading, by the IC UE, a physical D2D synchronization channel (PD2DSCH) of detected sources; refraining, by the IC UE, from transmitting the measurement report when the IC UE determines that there is another synchronization source belonging the IC UE's cell; and transmitting, by the IC UE, the measurement report to the TP when the UE determines that there is not another synchronization source belonging the IC UE's cell. In an embodiment, the method includes refraining from transmitting the measurement report for one of the out-of-coverage synchronization signals if a received signal strength (RSS) of the one of the out-of-coverage synchronization signals is less than a threshold.

In a disclosed embodiment, an in-coverage (IC) user equipment (UE) includes a processor and a non-transitory computer readable storage medium storing programming for execution by the processor, the programming including instructions to: obtain scanning parameters; scan for out-of-coverage synchronization signals; transmit a measurement report to a Transmission Point (TP) in response to a report trigger, the measurement report comprising information of one or more received out-of-coverage synchronization signals; receive a configuration command from the TP instructing the IC UE to become a synchronization source; and transmit a device-to-device (D2D) synchronization signal (SS) for a duration of time or until instructed not to do so by the TP.

In a disclosed embodiment, a method in a transmission point (TP) for selecting an in-network-coverage user equipment (UE) to serve as a synchronization source for out-of-network-coverage UEs for device-to-device (D2D) communications includes receiving, with the TP, a measurement report from a first one of a plurality of in-network-coverage UEs, the measurement report corresponding to an out-of-network coverage UE; selecting, with the TP, a second one of the in-network-coverage UEs to be a synchronization source; and transmitting, with the TP, a configuration message to the second one of the in-network-coverage UEs, the configuration message identifying the second one of the in-network-coverage UEs as the synchronization source, wherein only the second one of the in-network-coverage UEs is permitted to transmit a D2D synchronization signal (SS) during a specified time frame. In an embodiment, the method includes transmitting, with the TP, a scanning message to at least some of the in-network-coverage UEs, the scanning message instructing the in-network-coverage UEs when to scan for out-of-network UE signals. In an embodiment, the scanning message includes a first time duration indicating a duration of time for one of the in-network-coverage UEs to scan for D2DSS from out-of-network UEs, a second time duration indicating a length of time between successive scans, and a third time duration indicating a time after which the one of the in-network-coverage UEs is to stop scanning. In an embodiment, the scanning message includes a threshold, wherein in-network-coverage UEs that measure a received power from the TP above the threshold are prohibited from scanning. In an embodiment, the method includes determining a number of scanning groups of in-network-coverage UEs; and sending scanning parameters to each of the groups. In an embodiment, the scanning parameters for a first group are different from the scanning parameters for a second group. In an embodiment, the first one of the plurality of in-network-coverage UEs is the second one of the plurality of in-network-coverage UEs.

In a disclosed embodiment, a transmission point (TP) includes a processor and a non-transitory computer readable storage medium storing programming for execution by the processor, the programming including instructions to: receive a measurement report from a first one of a plurality of in-network-coverage UEs, the measurement report corresponding to an out-of-network coverage UE; select a second one of the in-network-coverage UEs to be a synchronization source; and transmit a configuration message to the second one of the in-network-coverage UEs, the configuration message identifying the second one of the in-network-coverage UEs as the synchronization source, wherein only the second one of the in-network-coverage UEs is permitted to transmit a D2D synchronization signal (SS) during a specified time frame.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method in an in-coverage (IC) user equipment (UE) for the IC UE to become a synchronization source for out-of-coverage UEs for device-to-device (D2D) communication, the method comprising:
   obtaining, by the IC UE, scanning parameters;
   scanning, by the IC UE, for out-of-coverage synchronization signals;
   in response to a report trigger:
      listening, by the IC UE, for a measurement report from other UEs for a listening time; and
      transmitting, by the IC UE, the measurement report to a Transmission Point (TP) in response to the IC UE determining that no other UE has transmitted the measurement report during the listening time, the measurement report comprising information of one or more received out-of-coverage synchronization signals;
   receiving, by the IC UE, a configuration command from the TP instructing the IC UE to become a synchronization source; and
   transmitting, by the IC UE, a D2D synchronization signal (D2DSS).

2. The method of claim 1, wherein the scanning parameters are preconfigured.

3. The method of claim 1, wherein the scanning parameters are received in a broadcast message.

4. The method of claim 1, wherein the scanning parameters comprise T1, T2, and T3, wherein T1 is a time gap between scanning windows, T2 is a length of time of each scanning window of the scanning windows, and T3 is a total length of time for scanning.

5. The method of claim 1, wherein the listening time comprises a random time.

6. The method of claim 1, further comprising:
   selecting, by the IC UE, a random number; and
   transmitting, by the IC UE, the measurement report in response to the random number being greater than a predetermined threshold.

7. The method of claim 1, further comprising:
   listening, by the IC UE, for the D2DSS from other UEs for the listening time; and
   transmitting, by the IC UE, the measurement report to the TP in response to the IC UE determining that no other UE has transmitted the D2DSS during the listening time.

8. The method of claim 1, further comprising:
   reading, by the IC UE, a physical D2D synchronization channel (PD2DSCH) of detected sources; and
   transmitting, by the IC UE, the measurement report to the TP in response to the IC UE determining that there is not another synchronization source belonging the IC UE's cell.

9. The method of claim 1, further comprising transmitting the measurement report for one of the out-of-coverage synchronization signals in response to a received signal strength (RSS) of the one of the out-of-coverage synchronization signals being greater than a threshold.

10. The method of claim 1, wherein transmitting the D2DSS comprises transmitting the D2DSS for a duration of time or until instructed not to do so by the TP.

11. An in-coverage (IC) user equipment (UE) comprising:
    a processor; and
    a non-transitory computer readable storage medium storing programming for execution by the processor, the programming including instructions to:
       obtain scanning parameters;
       scan for out-of-coverage synchronization signals;
       in response to a report trigger:
          listen for a measurement report from other UEs for a listening time; and
          transmit the measurement report to Transmission Point (TP) in response to the IC UE determining that no other UE has transmitted the measurement report during the listening time, the measurement report comprising information of one or more received out-of-coverage synchronization signals;
       receive a configuration command from the TP instructing the IC UE to become a synchronization source; and
       transmit a device-to-device (D2D) synchronization signal (D2DSS).

12. The IC UE of claim 11, wherein the scanning parameters are preconfigured.

13. The IC UE of claim 11, wherein the scanning parameters are received in a broadcast message.

14. The IC UE of claim 11, wherein the scanning parameters comprise T1, T2, and T3, wherein T1 is a time gap between scanning windows, T2 is a length of time of each scanning window of the scanning windows, and T3 is a total length of time for scanning.

15. The IC UE of claim 11, wherein the listening time comprises a random time.

16. The IC UE of claim 11, wherein the programming further comprises instructions to:
    select a random number; and
    transmit, by the IC UE, the measurement report in response to the random number being greater than a predetermined threshold.

17. The IC UE of claim 11, wherein the programming further comprises instructions to:
    listen for the D2DSS from other UEs for the listening time; and
    transmit the measurement report to the TP in response to the IC UE determining that no other UE has transmitted the D2DSS during the listening time.

18. The IC UE of claim 11, wherein the programming further comprises instructions to:
   read a physical D2D synchronization channel (PD2DSCH) of detected sources; and
   transmit the measurement report to the TP in response to the IC UE determining that there is not another synchronization source belonging the IC UE's cell.

19. The IC UE of claim 11, further comprising instructions to transmit the measurement report for one of the out-of-coverage synchronization signals in response to a received signal strength (RSS) of the one of the out-of-coverage synchronization signals being greater than a threshold.

20. The IC UE of claim 11, wherein the instructions to transmit the D2DSS comprise instructions to transmit the D2DSS for a duration of time or until instructed not to do so by the TP.

21. A method in an in-coverage (IC) user equipment (UE) for the IC UE to become a synchronization source for out-of-coverage UEs for device-to-device (D2D) communication, the method comprising:
   obtaining, by the IC UE, scanning parameters;
   scanning, by the IC UE, for out-of-coverage synchronization signals;
   in response to a report trigger:
      listening, by the IC UE, for a device-to-device (D2D) synchronization signal (D2DSS) from other UEs for a listening time; and
      transmitting, by the IC UE, a measurement report to a Transmission Point (TP) in response to the IC UE determining that no other UE has transmitted the D2DSS during the listening time, the measurement report comprising information of one or more received out-of-coverage synchronization signals;
   receiving, by the IC UE, a configuration command from the TP instructing the IC UE to become a synchronization source; and
   transmitting, by the IC UE, the D2DSS.

22. The method of claim 21, wherein the scanning parameters are preconfigured.

23. The method of claim 21, wherein the scanning parameters are received in a broadcast message.

24. The method of claim 21, wherein the scanning parameters comprise T1, T2, and T3, wherein T1 is a time gap between scanning windows, T2 is a length of time of each scanning window of the scanning windows, and T3 is a total length of time for scanning.

25. The method of claim 21, further comprising:
   selecting, by the IC UE, a random number; and
   transmitting, by the IC UE, the measurement report in response to the random number being greater than a predetermined threshold.

26. The method of claim 21, further comprising:
   reading, by the IC UE, a physical D2D synchronization channel (PD2DSCH) of detected sources; and
   transmitting, by the IC UE, the measurement report to the TP in response to the IC UE determining that there is not another synchronization source belonging the IC UE's cell.

27. The method of claim 21, further comprising transmitting the measurement report for one of the out-of-coverage synchronization signals in response to a received signal strength (RSS) of the one of the out-of-coverage synchronization signals being greater than a threshold.

28. The method of claim 21, wherein transmitting the D2DSS comprises transmitting the D2DSS for a duration of time or until instructed not to do so by the TP.

29. An in-coverage (IC) user equipment (UE) comprising:
   a processor; and
   a non-transitory computer readable storage medium storing programming for execution by the processor, the programming including instructions to:
      obtain scanning parameters;
      scan for out-of-coverage synchronization signals;
      in response to a report trigger:
         listen for a device-to-device (D2D) synchronization signal (D2DSS) from other UEs for a listening time; and
         transmit a measurement report to Transmission Point (TP) in response to the IC UE determining that no other UE has transmitted the D2DSS during the listening time, the measurement report comprising information of one or more received out-of-coverage synchronization signals;
      receive a configuration command from the TP instructing the IC UE to become a synchronization source; and
      transmit the D2DSS.

30. The IC UE of claim 29, wherein the scanning parameters are preconfigured.

31. The IC UE of claim 29, wherein the scanning parameters are received in a broadcast message.

32. The IC UE of claim 29, wherein the scanning parameters comprise T1, T2, and T3, wherein T1 is a time gap between scanning windows, T2 is a length of time of each scanning window of the scanning windows, and T3 is a total length of time for scanning.

33. The IC UE of claim 29, wherein the programming further comprises instructions to:
   select a random number; and
   transmit, by the IC UE, the measurement report in response to the random number being greater than a predetermined threshold.

34. The IC UE of claim 29, wherein the programming further comprises instructions to:
   read a physical D2D synchronization channel (PD2DSCH) of detected sources; and
   transmit the measurement report to the TP in response to the IC UE determining that there is not another synchronization source belonging the IC UE's cell.

35. The IC UE of claim 29, further comprising instructions to transmit the measurement report for one of the out-of-coverage synchronization signals in response to a received signal strength (RSS) of the one of the out-of-coverage synchronization signals being greater than a threshold.

36. The IC UE of claim 29, wherein the instructions to transmit the D2DSS comprise instructions to transmit the D2DSS for a duration of time or until instructed not to do so by the TP.

* * * * *